United States Patent
Hsu et al.

(10) Patent No.: US 8,369,027 B2
(45) Date of Patent: Feb. 5, 2013

(54) IMAGE CAPTURING OPTICAL LENS SYSTEM

(75) Inventors: Chih-Wen Hsu, Taichung (TW); Hsin-Hsuan Huang, Taichung (TW)

(73) Assignee: Largan Precision Co., Ltd., Taichung City (TW)

( * ) Notice: Subject to any disclaimer, the term of this patent is extended or adjusted under 35 U.S.C. 154(b) by 70 days.

(21) Appl. No.: 13/180,372

(22) Filed: Jul. 11, 2011

(65) Prior Publication Data

US 2012/0287513 A1    Nov. 15, 2012

(30) Foreign Application Priority Data

May 11, 2011    (TW) .............................. 100116513 A

(51) Int. Cl.
  *G02B 11/30*    (2006.01)
  *G02B 13/18*    (2006.01)
  *G02B 3/02*     (2006.01)

(52) U.S. Cl. ....................................... 359/714; 359/764

(58) Field of Classification Search .................. 359/708, 359/713, 714, 754–757, 763–765
See application file for complete search history.

(56) References Cited

U.S. PATENT DOCUMENTS

| 7,365,920 | B2 | 4/2008 | Noda |
| 8,233,224 | B2* | 7/2012 | Chen .............................. 359/764 |
| 2011/0228409 | A1* | 9/2011 | Uchida ......................... 359/715 |
| 2012/0105704 | A1* | 5/2012 | Huang et al. ................. 348/340 |
| 2012/0162784 | A1* | 6/2012 | Tang et al. .................... 359/714 |

* cited by examiner

*Primary Examiner* — Darryl J Collins
(74) *Attorney, Agent, or Firm* — Morris, Manning & Martin, LLP; Tim Tingkang Xia, Esq.

(57) ABSTRACT

This invention provides an image capturing optical lens system in order from an object side to an image side comprising: a first lens element with positive refractive power having a convex object-side surface; a second lens element with negative refractive power; a third lens element with negative refractive power having at least one of the object-side and image-side surfaces thereof being aspheric; a fourth lens element having at least one of the object-side and image-side surfaces thereof being aspheric; a fifth lens element having a concave image-side surface, both the object-side and image-side surfaces thereof being aspheric, at least one inflection point is formed on at least one of the object-side surface and the image-side surface thereof, and the fifth lens element is made of plastic. By such arrangement, photosensitivity and total track length of the system can be reduced, and the aberration and astigmatism of the system can be effectively corrected. Moreover, high image resolution can be obtained.

19 Claims, 16 Drawing Sheets

IMAGE CAPTURING OPTICAL LENS SYSTEM

CROSS-REFERENCE TO RELATED APPLICATIONS

This non-provisional application claims priority under 35 U.S.C. §119(a) on Patent Application No. 100116513 filed in Taiwan, R.O.C. on May 11, 2011, the entire contents of which are hereby incorporated by reference.

BACKGROUND OF THE INVENTION

1. Field of the Invention

The present invention relates to an image capturing optical lens system, and more particularly, to a compact image capturing optical lens system used in electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional image capturing lens system equipped on a portable electronic product is in various design of two-lens element, three-lens element, four-lens element or five-lens element, such as the one set forth in U.S. Pat. No. 7,365,920. However, with the popularity of high level portable electronic products, such as smart phone and PDA (Personal Digital Assistant), the demand for the pixel size and image quality of compact imaging lens system increase fast, and the conventional lens system with four lens elements can no longer satisfy the imaging lens systems of even higher level. Moreover, a conventional image capturing lens system having five lens elements usually adopts an assembly different in positive or negative refractive power or a cemented doublet lens element. This kind of five-lens element lens system frequently has the drawback of excessively long total track length so that is not suitable for compact electronic products Inasmuch as the foregoing, a need is continuously existed for a lens system with good image quality and moderate total track length and is suitable for applying for compact and portable electronic products.

SUMMARY OF THE INVENTION

The present invention provides an image capturing optical lens system comprising, in order from an object side to an image side: a first lens element with positive refractive power having a convex object-side surface; a second lens element with negative refractive power; a third lens element with negative refractive power having at least one of the object-side and image-side surfaces thereof being aspheric; a fourth lens element having at least one of the object-side and image-side surfaces thereof being aspheric; and a fifth lens element having a concave image-side surface, both the object-side and image-side surfaces thereof being aspheric, at least one inflection point is formed on at least one of the object-side and image-side surfaces thereof, and the fifth lens element is made of plastic; wherein a curvature radius of the object-side surface of the fourth lens element is R7, a curvature radius of the image-side surface of the fourth lens element is R8, a focal length of the second lens element is f2, a focal length of the third lens element is f3, a focal length of the image capturing optical lens system is f, and they satisfy the following relations: $4.0<|R7/R8|$; $0.8<f2/f3<10.0$; and $-2.0<f3/f<-0.67$.

By such arrangement, photosensitivity and total track length of the system can be reduced, and the aberration and astigmatism of the system can be effectively corrected. Moreover, high image resolution can be obtained.

In the aforementioned image capturing optical lens system, the first lens element has positive refractive power and thereby can provide refractive power needed for the system and is favorable for reducing the total track length thereof. When the second lens element has negative refractive power, the aberration provided by the first lens element can be effectively corrected. When the third lens element has negative refractive power, it can cooperate with the second lens element for correcting the aberration; meanwhile, the fourth lens element can provide the positive refractive power needed for the system to reduce the error sensitivity thereof. When the fourth lens element has positive refractive power and the fifth lens element has negative refractive power, a positive-negative telephoto structure is formed so that the back focal length of the system is favorably reduced for shortening the total track length of the system.

In the aforementioned image capturing optical lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the second lens element has a concave image-side surface, the negative refractive power of the second lens element can be effectively strengthened for obtaining better aberration correction ability. When the third lens element has a concave object-side surface, it is favorable for correcting the astigmatism of the system. When the fourth lens element has a convex image-side surface, the positive refractive power of the fourth lens element can be effectively strengthened and the error sensitivity of the system can be reduced. When the fifth lens element has a concave object-side surface, the negative refractive power of the fifth lens element can be properly adjusted to cooperate with the fourth lens element for obtaining the telephoto effect. When the fifth lens element has a concave image-side surface, the principal point of the system can be positioned away from the image plane, and the back focal length of the system can be reduced for favorably shortening the total track length thereof and keeping the system compact. Furthermore, when at least one inflection is formed on the fifth lens element, the angle at which light projects onto the image sensor from the off-axis field can be effectively reduced so that the sensing efficiency of the image sensor can be improved and the off-axis aberration can be corrected. Proper adjustment of the ratio between the focal length of the third lens element and the focal length of the image capturing optical lens system or the focal length of the second lens element can make the second and the third lens elements, which have negative refractive power, obtain better aberration correction ability. Also, arranging the ratio of the radii of the curvature of the object-side and image-side surfaces of the fourth lens element in specific range can make the refractive power thereof even more proper for favorably reducing the error sensitivity of the system.

DETAILED DESCRIPTION OF THE PREFERRED EMBODIMENTS

Figure 1A:
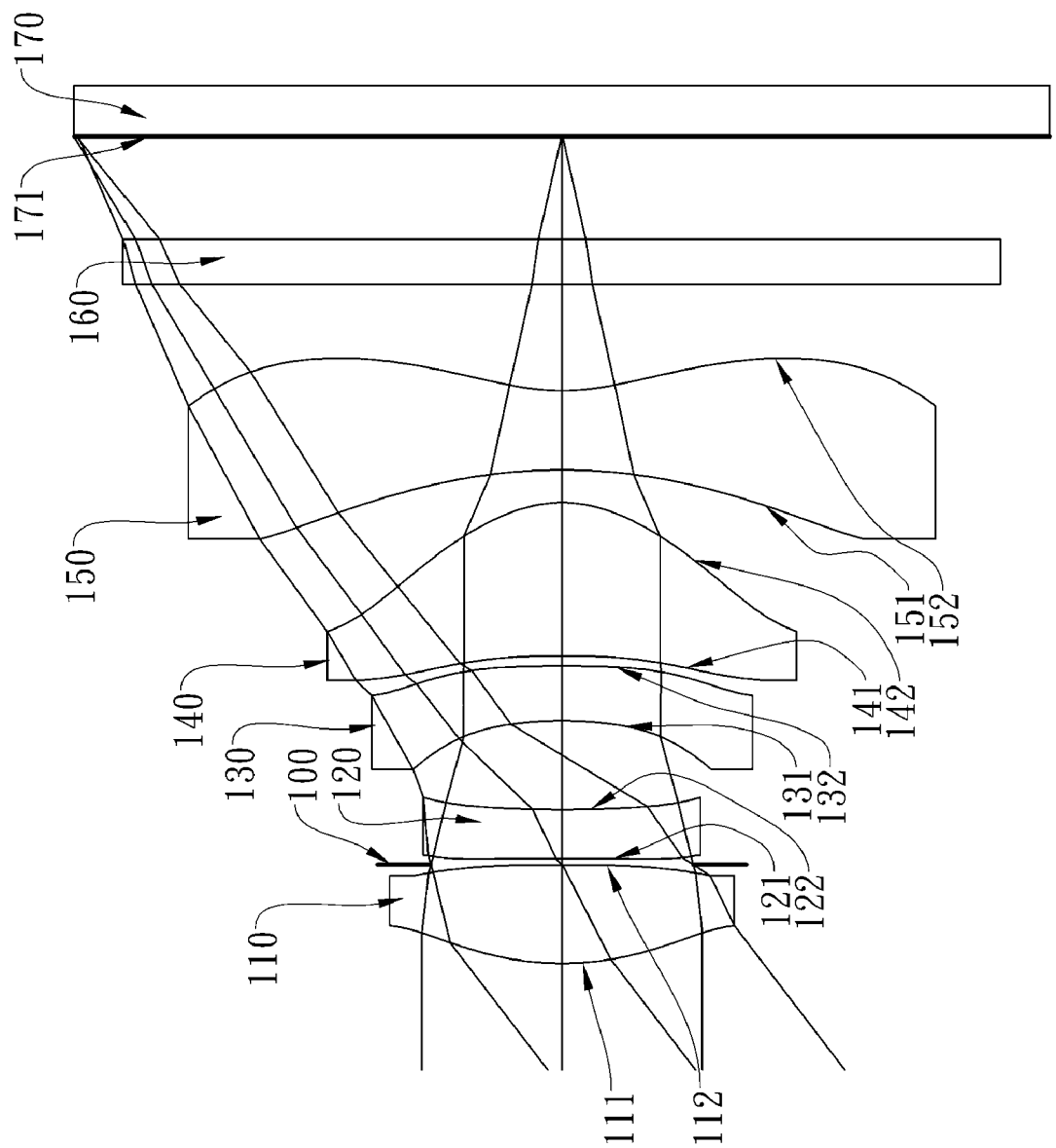
FIG. 1A shows an image capturing optical lens system in accordance with a first embodiment of the present invention.

The present invention provides an image capturing optical lens system comprising, in order from an object side to an image side: a first lens element with positive refractive power having a convex object-side surface; a second lens element with negative refractive power; a third lens element with negative refractive power having at least one of the object-side and image-side surfaces thereof being aspheric; a fourth lens element having at least one of the object-side and image-side surfaces thereof being aspheric; and a fifth lens element having a concave image-side surface, both the object-side and image-side surfaces thereof being aspheric, at least one inflection point is formed on at least one of the object-side and image-side surfaces thereof, and the fifth lens element is made of plastic; wherein a curvature radius of the object-side surface of the fourth lens element is R7, a curvature radius of the image-side surface of the fourth lens element is R8, a focal length of the second lens element is f2, a focal length of the third lens element is f3, a focal length of the image capturing optical lens system is f, and they satisfy the following relations: $4.0<|R7/R8|$; $0.8<f2/f3<10.0$; and $-2.0<f3/f<-0.67$.

When the relation of $4.0<|R7/R8|$ is satisfied, the positive refractive power of the fourth lens element is more suitable for not only reducing the error sensitivity of the system but also facilitating the manufacture thereof; preferably, the following relation is satisfied: $7.0<|R7/R8|$.

When the relation of $0.8<f2/f3<10.0$ is satisfied, the distribution of the negative refractive power of the second and the third lens elements is more proper, and thereby the aberration of the system can be favorably corrected; preferably, the following relation is satisfied: $1.2<f2/f3<4.5$.

When the relation of $-2.0<f3/f<-0.67$ is satisfied, the refractive power of the third lens element is more suitable for favorably correcting the aberration of the system; preferably, the following relation is satisfied: $-1.7<f3/f<-0.8$.

In the aforementioned image capturing optical lens system, a curvature radius of the object-side surface of the first lens element is R1, a curvature radius of the image-side surface of the first lens element is R2, and they preferably satisfy the following relation: $-0.8<R1/R2<0.8$. When the above relation is satisfied, the spherical aberration can be favorably corrected and the positive refractive power of the first lens element can be properly adjusted; more preferably, the following relation is satisfied: $-0.3<R1/R2<0.2$.

In the aforementioned image capturing optical lens system, a focal length of the fourth lens element is f4, a focal length of the fifth lens element is f5, a focal length of the second lens element is f2, a focal length of the third lens element is f3, and they preferably satisfy the following relation: $0.05<(|f4|+|f5|)/(|f2|+|f3|)<0.5$. When the above relation is satisfied, the refractive power of the second lens element can cooperate with the refractive power of the third lens element for effectively correcting the aberration of the system; moreover, the arrangement of the positive and negative refractive power of the fourth lens element and the fifth lens element respectively can obtain a better telephoto effect so that the back focal length of the system can be reduced favorably; more preferably, the following relation is satisfied: $0.1<(|f4|+|f5|)/(|f2|+|f3|)<0.3$.

In the aforementioned image capturing optical lens system, a curvature radius of the object-side surface of the second lens element is R3, a curvature radius of the image-side surface of the second lens element is R4, and they preferably satisfy the following relation: $|R3|>|R4|$. When the above relation is satisfied, the curvature of the second lens element is more suitable so that a better aberration correction effect can be obtained.

In the aforementioned image capturing optical lens system, a curvature radius of the object-side surface of the third lens element is R5, a curvature radius of the image-side surface of the third lens element is R6, and they preferably satisfy the following relation: $|R5|<|R6|$. When the above relation is satisfied, the curvature of the third lens element is more suitable to cooperate with the second lens element for aberration correction.

In the aforementioned image capturing optical lens system, an axial distance between the first lens element and the second lens element is T12, an axial distance between the third lens element and the fourth lens element is T34, an axial distance between the second lens element and the third lens element is T23, and they preferably satisfy the following relation: $0.1<(T12+T34)/T23<0.5$. When the above relation is satisfied, the interval between the lens elements in the system is more suitable, which is favorable for not only the arrangement and assembly of the lens elements but also the organization of the space in the system for keeping the system compact.

In the aforementioned image capturing optical lens system, an Abbe number of the first lens element is V1, an Abbe number of the second lens element is V2, an Abbe number of the third lens element is V3, and they preferably satisfy the following relation: $(V2+V3)/V1<1.0$. When the above relation is satisfied, the chromatic aberration of the system can be adjusted and corrected favorably.

In the aforementioned image capturing optical lens system, the curvature radius of the image-side surface of the fourth lens element is R8, a curvature radius of the image-side surface of the fifth lens element is R10, and they preferably satisfy the following relation: −1.0<R8/R10<−0.5. When the above relation is satisfied, the curvature of the fourth and the fifth lens element is more suitable for obtaining a positive-negative telephoto effect, and thereby the back focal length of the system can be reduced for shortening the total track length thereof favorably.

In the aforementioned image capturing optical lens system, the focal length of the image capturing optical lens system is f, the focal length of the fourth lens element is f4, and they preferably satisfy the following relation: f/f4>2.0. When the above relation is satisfied, the refractive power of the fourth lens element is more suitable for favorably reducing the error sensitivity of the system and facilitating the manufacture thereof.

In the aforementioned image capturing optical lens system, the focal length of the image capturing optical lens system is f, the focal length of the fifth lens element is f5, and they preferably satisfy the following relation: f/f5<−2.0. When the above relation is satisfied, the fifth lens element is complementary to balance with the refractive power of the fourth lens element, and thereby the back focal length of the system is reduced for shortening the total track length thereof.

In the aforementioned image capturing optical lens system, the system further comprises a stop, an axial distance between the stop and the image-side surface of the fifth lens element is Sd, an axial distance between the object-side surface of the first lens element and the image-side surface of the fifth lens element is Td, and they preferably satisfy the following relation: 0.75<Sd/Td<1.1. When the above relation is satisfied, it is favorable for obtaining a better balance between the properties of telecentric and wide field of view.

In the aforementioned image capturing optical lens system, a central thickness of the second lens element is CT2, a central thickness of the third lens element is CT3, and they preferably satisfy the following relation: 0.7<CT2/CT3<1.3. When the above relation is satisfied, the thickness of each lens element in the system is more suitable, which is not only favorable for the manufacture and assembly of the lens elements but also for obtaining a moderate total track length of the system.

In the aforementioned image capturing optical lens system, the system further comprises an image sensor provided on an image plane, half of a diagonal length of an effective photosensitive area of the image sensor is ImgH, the focal length of the image capturing optical lens system is f, and they preferably satisfy the following relation: $\tan^{-1}(ImgH/f)>34$. When the above relation is satisfied, a sufficient field of view can be favorably provided.

In the aforementioned image capturing optical lens system, an axial distance between the object-side surface of the first lens element and the image plane is TTL, half of a diagonal length of an effective photosensitive area of the image sensor is ImgH, and they preferably satisfy the following relation: TTL/ImgH<2.0. When the above relation is satisfied, it is favorable for keeping the system compact in order to be equipped on portable electronic products.

In the aforementioned image capturing optical lens system, the lens elements can be made of glass or plastic material. If the lens elements are made of glass, the freedom for distributing the refractive power of the image capturing optical lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing optical lens system can be effectively reduced.

In the present image capturing optical lens system, if a lens element has a convex surface, it means the portion of the surface in proximity to the optical axis is convex; if a lens element has a concave surface, it means the portion of the surface in proximity to the optical axis is concave.

In the present image capturing optical lens system, there can be at least one stop, such as a glare stop or a field stop, provided for eliminating stray light and thereby promoting image resolution thereof.

Preferred embodiments of the present invention will be described in the following paragraphs by referring to the accompanying drawings.

Embodiment 1

Figure 1B:
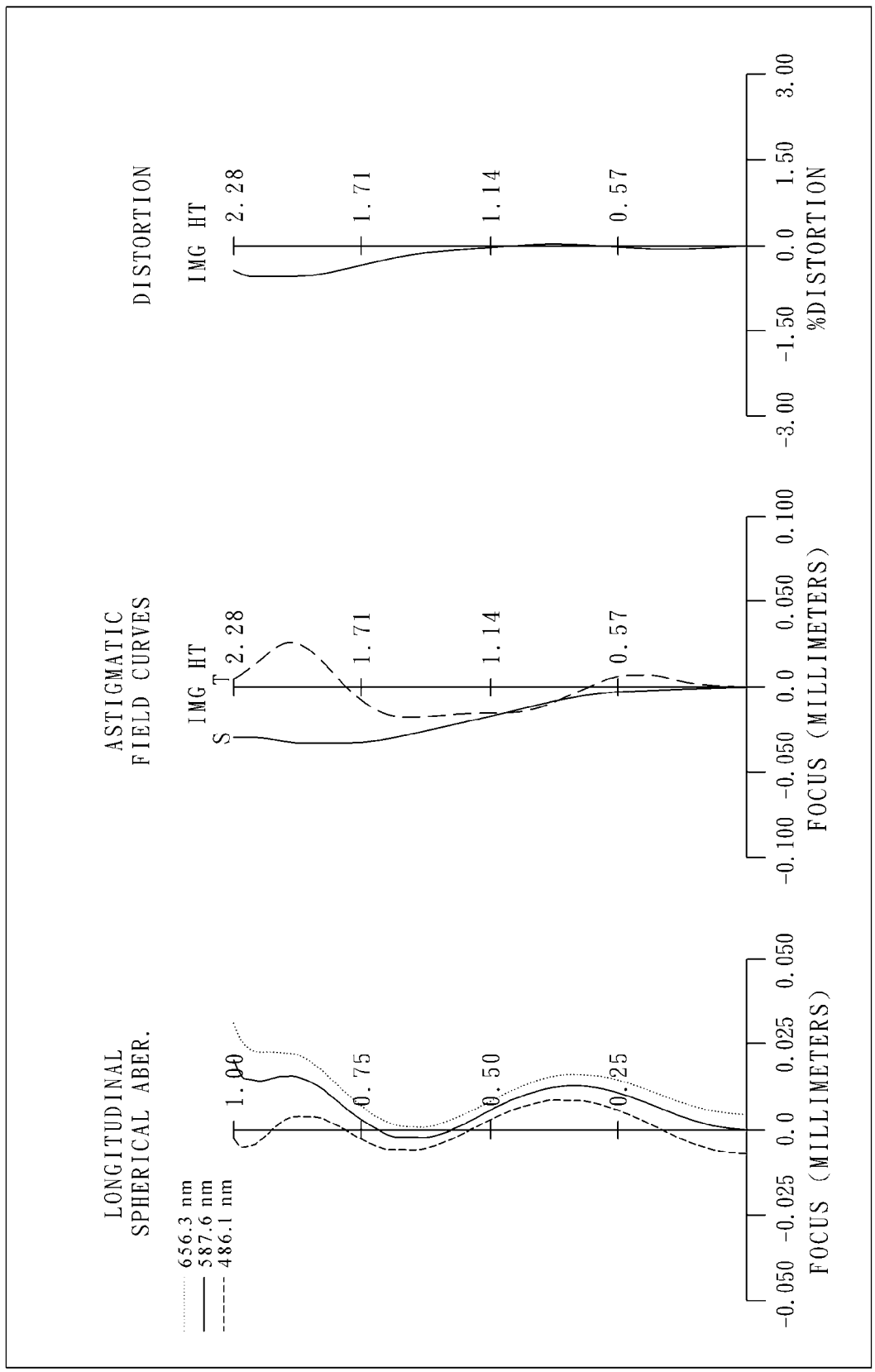
FIG. 1B shows the aberration curves of the first embodiment of the present invention.

FIG. 1A shows an image capturing optical lens system in accordance with the first embodiment of the present invention, and FIG. 1B shows the aberration curves of the first embodiment of the present invention. The image capturing optical lens system of the first embodiment of the present invention mainly comprises five lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a convex object-side surface 121 and a concave image-side surface 122, the object-side and image-side surfaces 121 and 122 thereof being aspheric;

a third lens element 130 made of plastic with negative refractive power having a concave object-side surface 131 and a convex image-side surface 132, the object-side and image-side surfaces 131 and 132 thereof being aspheric;

a fourth lens element 140 made of plastic with positive refractive power having a concave object-side surface 141 and a convex image-side surface 142, the object-side and image-side surfaces 141 and 142 thereof being aspheric; and a fifth lens element 150 made of plastic with negative refractive power having a concave object-side surface 151 and a concave image-side surface 152, the object-side and image-side surfaces 151 and 152 thereof being aspheric, and at least one inflection point is formed on the image-side surface 152 thereof;

wherein an aperture stop 100 is disposed between the first lens element 110 and the second lens element 120;

the image capturing optical lens system further comprises an IR filter 160 disposed between the image-side surface 152 of the fifth lens element 150 and an image plane 171, and the IR filter 160 is made of glass and has no influence on the focal length of the image capturing optical lens system; the image capturing optical lens system further comprises an image sensor 170 provided on the image plane 171.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 3.00 mm, Fno = 2.28, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.370860 (ASP) | 0.461 | Plastic | 1.544 | 55.9 | 2.45 |
| 2 | | −42.316000 (ASP) | 0.002 | | | | |
| 3 | Ape. Stop | Plano | 0.028 | | | | |
| 4 | Lens 2 | 55.511500 (ASP) | 0.230 | Plastic | 1.640 | 23.3 | −10.71 |
| 5 | | 6.089700 (ASP) | 0.416 | | | | |
| 6 | Lens 3 | −2.044980 (ASP) | 0.257 | Plastic | 1.640 | 23.3 | −4.01 |
| 7 | | −10.548300 (ASP) | 0.048 | | | | |
| 8 | Lens 4 | −5.277500 (ASP) | 0.719 | Plastic | 1.544 | 55.9 | 1.18 |
| 9 | | −0.600800 (ASP) | 0.153 | | | | |
| 10 | Lens 5 | −2.653050 (ASP) | 0.372 | Plastic | 1.535 | 56.3 | −1.28 |
| 11 | | 0.972140 (ASP) | 0.500 | | | | |
| 12 | IR-filter | Plano | 0.210 | Glass | 1.517 | 64.2 | — |
| 13 | | Plano | 0.482 | | | | |
| 14 | Image | Plano | — | | | | |

* Reference wavelength is d-line 587.6 nm

TABLE 2

Aspheric Coefficients

| | Surface # | | | | |
|---|---|---|---|---|---|
| | 1 | 2 | 4 | 5 | 6 |
| k = | −6.84330E+00 | −9.90000E+01 | 9.90000E+01 | 4.52277E+01 | 6.27428E+00 |
| A4 = | 2.83655E−01 | −4.82434E−01 | −3.63746E−01 | 2.47545E−03 | −2.43249E−01 |
| A6 = | −4.64186E−01 | 1.37888E+00 | 2.02144E+00 | 8.80386E−02 | −6.34867E−01 |
| A8 = | 2.14773E−01 | −2.51317E+00 | −3.80292E+00 | 1.06160E+00 | 4.43834E−01 |
| A10 = | −8.78783E−02 | 2.51184E+00 | 3.96236E+00 | −2.97885E+00 | 2.81205E+00 |
| A12 = | −8.94184E−01 | −1.96875E+00 | 1.41467E+00 | 3.43937E+00 | −1.91108E+00 |
| A14 = | 1.03756E+00 | 1.49388E+00 | −4.51671E+00 | −1.14527E+00 | −6.67705E−03 |
| A16 = | −5.98275E−03 | 3.60791E−08 | 3.08911E−08 | 3.18903E−08 | |

| | Surface # | | | | |
|---|---|---|---|---|---|
| | 7 | 8 | 9 | 10 | 11 |
| k = | −5.00000E+01 | −1.55945E+01 | −2.89589E+00 | 0.00000E+00 | −9.94146E+00 |
| A4 = | −4.20534E−01 | −4.70621E−01 | −3.91458E−01 | 3.72311E−03 | −1.60432E−01 |
| A6 = | 3.75802E−01 | 1.04475E+00 | 4.68810E−01 | −4.28023E−04 | 1.19515E−01 |
| A8 = | −5.53883E−01 | −1.21106E+00 | −4.02764E−01 | 3.28592E−02 | −7.08371E−02 |
| A10 = | 1.06677E+00 | 1.09751E+00 | 4.27445E−01 | −4.51650E−02 | 2.58514E−02 |
| A12 = | −5.57289E−01 | −6.77397E−01 | −2.17134E−01 | 2.98118E−02 | −5.33950E−03 |
| A14 = | −1.09920E−02 | 2.26782E−01 | 3.00043E−02 | −9.74469E−03 | 4.69273E−04 |
| A16 = | | −4.43605E−02 | 7.54561E−04 | 1.29684E−03 | |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:
X: the height of a point on the aspheric surface at a distance Y from the optical axis relative to the tangential plane at the aspheric surface vertex;
Y: the distance from the point on the curve of the aspheric surface to the optical axis;
k: the conic coefficient;
Ai: the aspheric coefficient of order i.

In the first embodiment of the present image capturing optical lens system, the focal length of the image capturing optical lens system is f, and it satisfies the following relation: f=3.00 (mm).

In the first embodiment of the present image capturing optical lens system, the f-number of the image capturing optical lens system is Fno, and it satisfies the relation: Fno=2.28.

In the first embodiment of the present image capturing optical lens system, half of the maximal field of view of the image capturing optical lens system is HFOV, and it satisfies the relation: HFOV=37.4 deg.

In the first embodiment of the present image capturing optical lens system, an Abbe number of the second lens element 120 is V2, an Abbe number of the third lens element 130 is V3, an Abbe number of the first lens element 110 is V1, and they satisfy the following relation: (V2+V3)/V1=0.83.

In the first embodiment of the present image capturing optical lens system, an axial distance on the optical axis between the image-side surface 112 of the first lens element 110 and the object-side surface 121 of the second lens element 120 is T12, an axial distance on the optical axis between the image-side surface 132 of the third lens element 130 and the object-side surface 141 of the fourth lens element 140 is T34, an axial distance on the optical axis between the image-side surface 122 of the second lens element 120 and the object-side surface 131 of the third lens element 130 is T23, and they preferably satisfy the following relation: (T12+T34)/T23=0.19.

In the first embodiment of the present image capturing optical lens system, a central thickness of the second lens element 120 is CT2, a central thickness of the third lens element 130 is CT3, and they satisfy the relation: CT2/CT3=0.89.

In the first embodiment of the present image capturing optical lens system, a curvature radius of the object-side surface 111 of the first lens element 110 is R1, a curvature radius of the image-side surface 112 of the first lens element 110 is R2, and they satisfy the relation: R1/R2=−0.03.

In the first embodiment of the present image capturing optical lens system, a curvature radius of the object-side surface 141 of the fourth lens element 140 is R7, a curvature radius of the image-side surface 142 of the fourth lens element 140 is R8, and they satisfy the relation: |R7/R8|=8.78.

In the first embodiment of the present image capturing optical lens system, the curvature radius of the image-side surface 142 of the fourth lens element 140 is R8, a curvature radius of the image-side surface 152 of the fifth lens element 150 is R10, and they satisfy the following relation: R8/R10=−0.62.

In the first embodiment of the present image capturing optical lens system, a focal length of the third lens element 130 is f3, a focal length of the image capturing optical lens system is f, and they satisfy the following relation: f3/f=−1.34.

In the first embodiment of the present image capturing optical lens system, a focal length of the second lens element 120 is f2, a focal length of the third lens element 130 is f3, and they satisfy the following relation: f2/f3=2.67.

In the first embodiment of the present image capturing optical lens system, a focal length of the image capturing optical lens system is f, a focal length of the fourth lens element 140 is f4, and they satisfy the following relation: f/f4=2.53.

In the first embodiment of the present image capturing optical lens system, a focal length of the image capturing optical lens system is f, a focal length of the fifth lens element 150 is f5, and they satisfy the following relation: f/f5=−2.33.

In the first embodiment of the present image capturing optical lens system, a focal length of the fourth lens element 140 is f4, a focal length of the fifth lens element 150 is f5, a focal length of the second lens element 120 is f2, a focal length of the third lens element 130 is f3, and they satisfy the following relation: (|f4|+|f5|)/(|f2|+|f3|)=0.17.

In the first embodiment of the present image capturing optical lens system, half of a diagonal length of an effective photosensitive area of the image sensor 170 is ImgH, the focal length of the image capturing optical lens system is f, and they satisfy the following relation: $\tan^{-1}(\text{ImgH}/f)=37.30$.

In the first embodiment of the present image capturing optical lens system, an axial distance between the aperture stop 100 and the image-side surface 152 of the fifth lens element 150 is Sd, an axial distance between the object-side surface 111 of the first lens element 110 and the image-side surface 152 of the fifth lens element 150 is Td, and they satisfy the following relation: Sd/Td=0.83.

In the first embodiment of the present image capturing optical lens system, an axial distance between the object-side surface 111 of the first lens element 110 and the image plane 171 is TTL, half of a diagonal length of an effective photosensitive area of the image sensor 170 is ImgH, and they satisfy the following relation: TTL/ImgH=1.67.

Embodiment 2

Figure 2A:
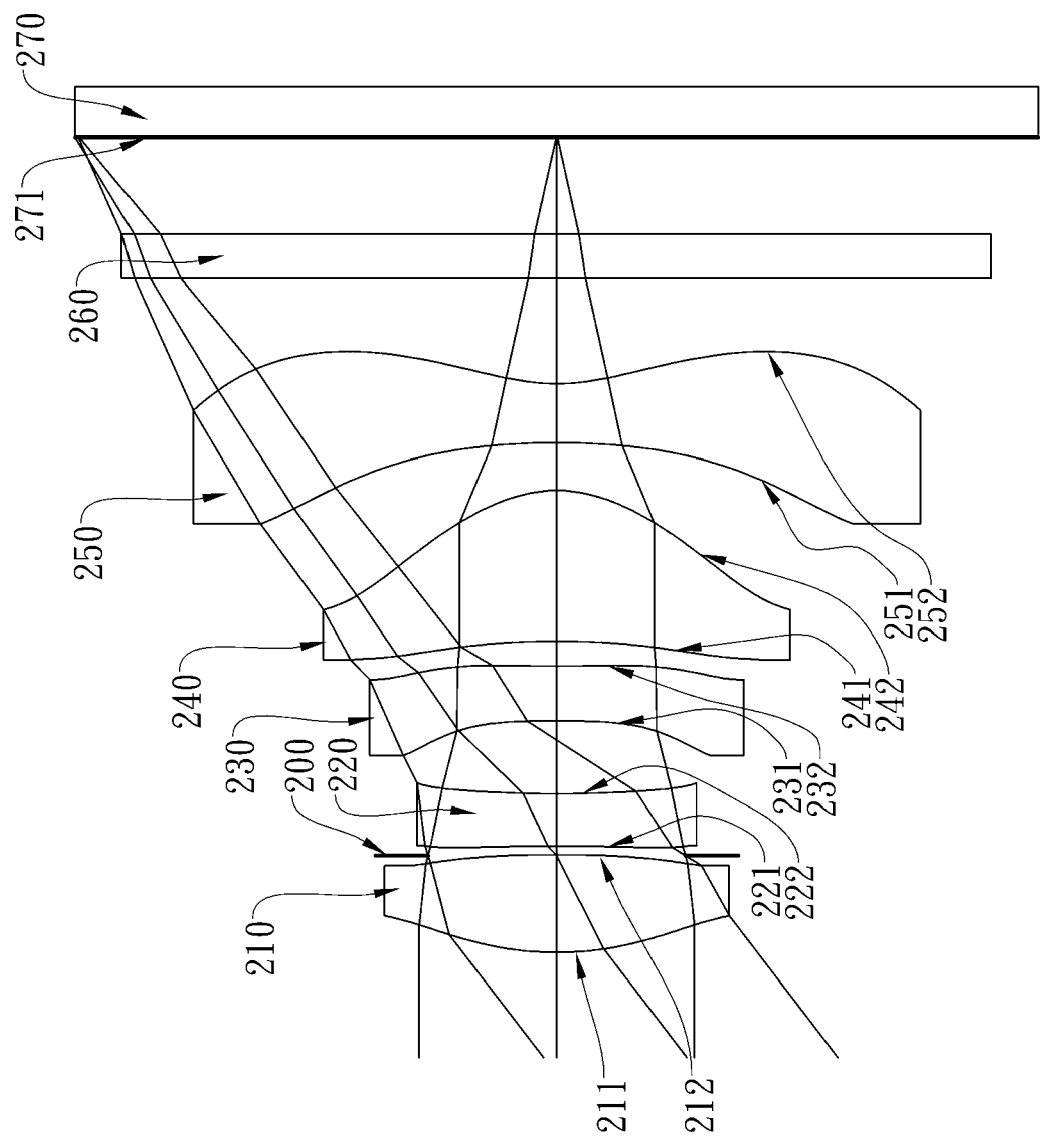
FIG. 2A shows an image capturing optical lens system in accordance with a second embodiment of the present invention.
Figure 2B:
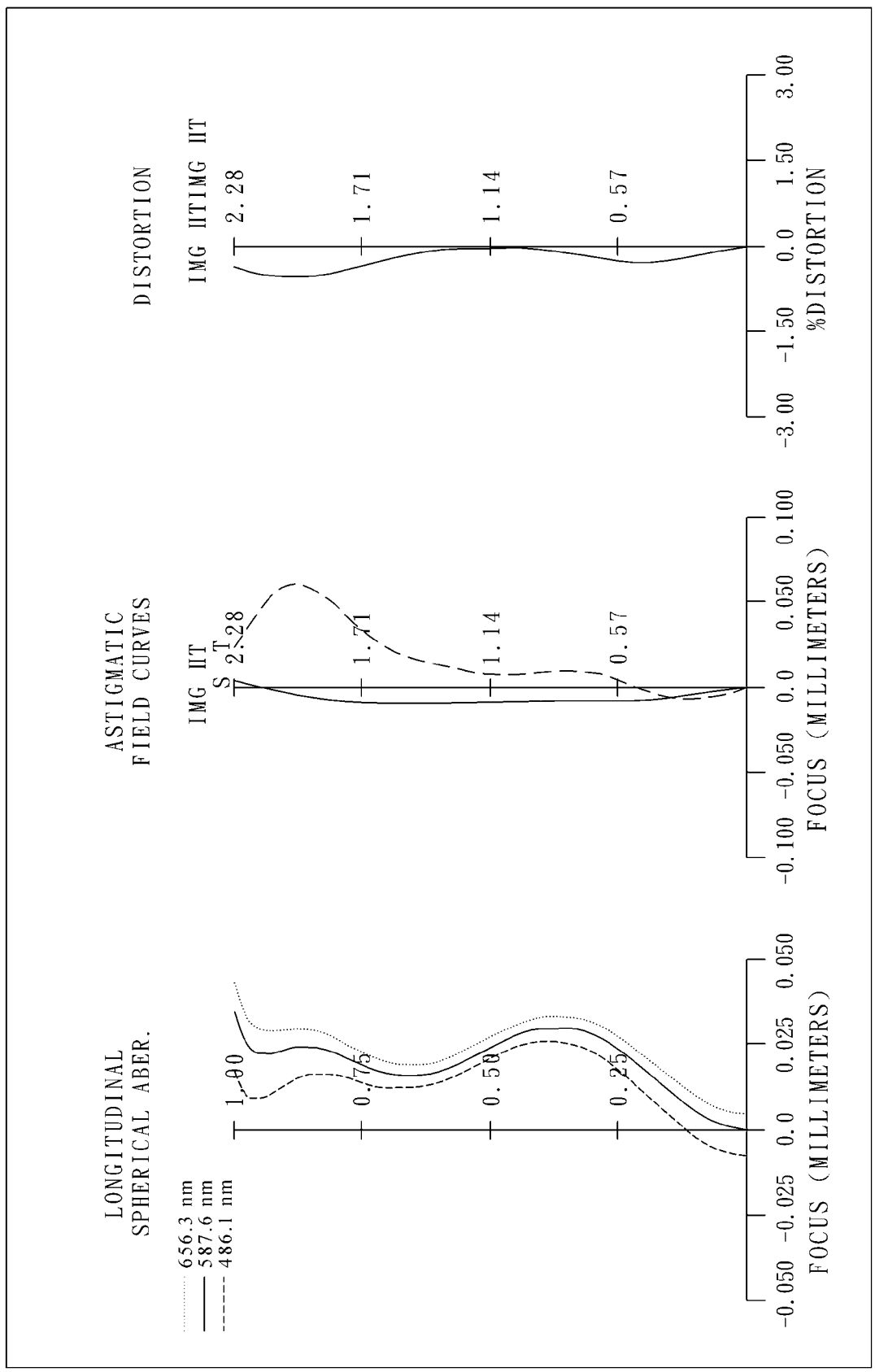
FIG. 2B shows the aberration curves of the second embodiment of the present invention.

FIG. 2A shows an image capturing optical lens system in accordance with the second embodiment of the present invention, and FIG. 2B shows the aberration curves of the second embodiment of the present invention. The image capturing optical lens system of the second embodiment of the present invention mainly comprises five lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a convex object-side surface 221 and a concave image-side surface 222, the object-side and image-side surfaces 221 and 222 thereof being aspheric;

a third lens element 230 made of plastic with negative refractive power having a concave object-side surface 231 and a concave image-side surface 232, the object-side and image-side surfaces 231 and 232 thereof being aspheric;

a fourth lens element 240 made of plastic with positive refractive power having a concave object-side surface 241 and a convex image-side surface 242, the object-side and image-side surfaces 241 and 242 thereof being aspheric; and a fifth lens element 250 made of plastic with negative refractive power having a concave object-side surface 251 and a concave image-side surface 252, the object-side and image-side surfaces 251 and 252 thereof being aspheric, and at least one inflection point is formed on the image-side surface 252 thereof;

wherein an aperture stop 200 is disposed between the first lens element 210 and the second lens element 220;

the image capturing optical lens system further comprises an IR filter 260 disposed between the image-side surface 252 of the fifth lens element 250 and an image plane 271, and the IR filter 260 is made of glass and has no influence on the focal length of the image capturing optical lens system; the image capturing optical lens system further comprises an image sensor 270 provided on the image plane 271.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.98 mm, Fno = 2.28, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.488160 (ASP) | 0.464 | Plastic | 1.544 | 55.9 | 2.46 |
| 2 | | −11.737100 (ASP) | −0.003 | | | | |

TABLE 3-continued (Embodiment 2)
f = 2.98 mm, Fno = 2.28, HFOV = 37.4 deg.

| Surface # | | Curvature Radius | Thickness | Material | Index | Abbe # | Focal length |
|---|---|---|---|---|---|---|---|
| 3 | Ape. Stop | Plano | 0.043 | | | | |
| 4 | Lens 2 | 100.000000 (ASP) | 0.250 | Plastic | 1.634 | 23.8 | −7.91 |
| 5 | | 4.773300 (ASP) | 0.347 | | | | |
| 6 | Lens 3 | −7.345100 (ASP) | 0.260 | Plastic | 1.634 | 23.8 | −4.96 |
| 7 | | 5.584400 (ASP) | 0.119 | | | | |
| 8 | Lens 4 | −4.753500 (ASP) | 0.717 | Plastic | 1.544 | 55.9 | 1.25 |
| 9 | | −0.624710 (ASP) | 0.228 | | | | |
| 10 | Lens 5 | −3.516400 (ASP) | 0.280 | Plastic | 1.544 | 55.9 | −1.32 |
| 11 | | 0.929150 (ASP) | 0.500 | | | | |
| 12 | IR-filter | Plano | 0.210 | Glass | 1.517 | 64.2 | — |
| 13 | | Plano | 0.462 | | | | |
| 14 | Image | Plano | — | | | | |

* Reference wavelength is d-line 587.6 nm

TABLE 4

Aspheric Coefficients

| | Surface # | | | | |
|---|---|---|---|---|---|
| | 1 | 2 | 4 | 5 | 6 |
| k = | −1.28358E+01 | 9.90000E+01 | −9.90000E+01 | −1.79663E+00 | 3.24760E+01 |
| A4 = | 3.96180E−01 | −4.58729E−01 | −4.94364E−01 | −2.15180E−01 | −6.69916E−01 |
| A6 = | −7.74711E−01 | 1.58097E+00 | 2.43974E+00 | 6.93206E−01 | −4.94982E−03 |
| A8 = | 7.10962E−01 | −3.12469E+00 | −4.82449E+00 | −3.85470E−01 | −1.73169E−01 |
| A10 = | −2.87028E−01 | 3.26869E+00 | 4.94838E+00 | −1.12837E+00 | 2.88291E+00 |
| A12 = | −8.96631E−01 | −1.96875E+00 | 1.41467E+00 | 3.43937E+00 | −1.90503E+00 |
| A14 = | 1.05298E+00 | 1.49388E+00 | −4.51671E+00 | −1.14527E+00 | −6.67710E−03 |
| A16 = | −5.98276E−03 | 8.03932E−09 | 2.88069E−09 | 3.22775E−09 | |

| | Surface # | | | | |
|---|---|---|---|---|---|
| | 7 | 8 | 9 | 10 | 11 |
| k = | −3.89145E+01 | −5.40120E+01 | −2.81788E+00 | 0.00000E+00 | −8.82541E+00 |
| A4 = | −5.50585E−01 | −3.33900E−01 | −3.16718E−01 | −5.61100E−02 | −1.77300E−01 |
| A6 = | 6.50135E−01 | 8.89009E−01 | 4.06687E−01 | −1.78692E−03 | 1.23613E−01 |
| A8 = | −7.48054E−01 | −1.22266E+00 | −3.89371E−01 | 3.29201E−02 | −7.24353E−02 |
| A10 = | 9.43783E−01 | 1.16302E+00 | 4.44792E−01 | −4.31605E−02 | 2.61032E−02 |
| A12 = | −3.99774E−01 | −6.88640E−01 | −2.25636E−01 | 3.06650E−02 | −5.29966E−03 |
| A14 = | −5.53017E−03 | 1.95674E−01 | 1.73708E−02 | −9.81950E−03 | 4.57949E−04 |
| A16 = | | −1.76978E−02 | 9.40196E−03 | 1.15431E−03 | |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f | 2.98 | f3/f | −1.67 |
|---|---|---|---|
| Fno | 2.28 | f2/f3 | 1.59 |
| HFOV | 37.4 | f/f4 | 2.39 |
| (V2 + V3)/V1 | 0.85 | f/f5 | −2.26 |
| (T12 + T34)/T23 | 0.46 | (|f4| + |f5|)/(|f2| + |f3|) | 0.20 |
| CT2/CT3 | 0.96 | tan$^{-1}$(ImgH/f) | 37.48 |
| R1/R2 | −0.13 | Sd/Td | 0.83 |
| |R7/R8| | 7.61 | TTL/ImgH | 1.67 |
| R8/R10 | −0.67 | | |

Embodiment 3

Figure 3A:
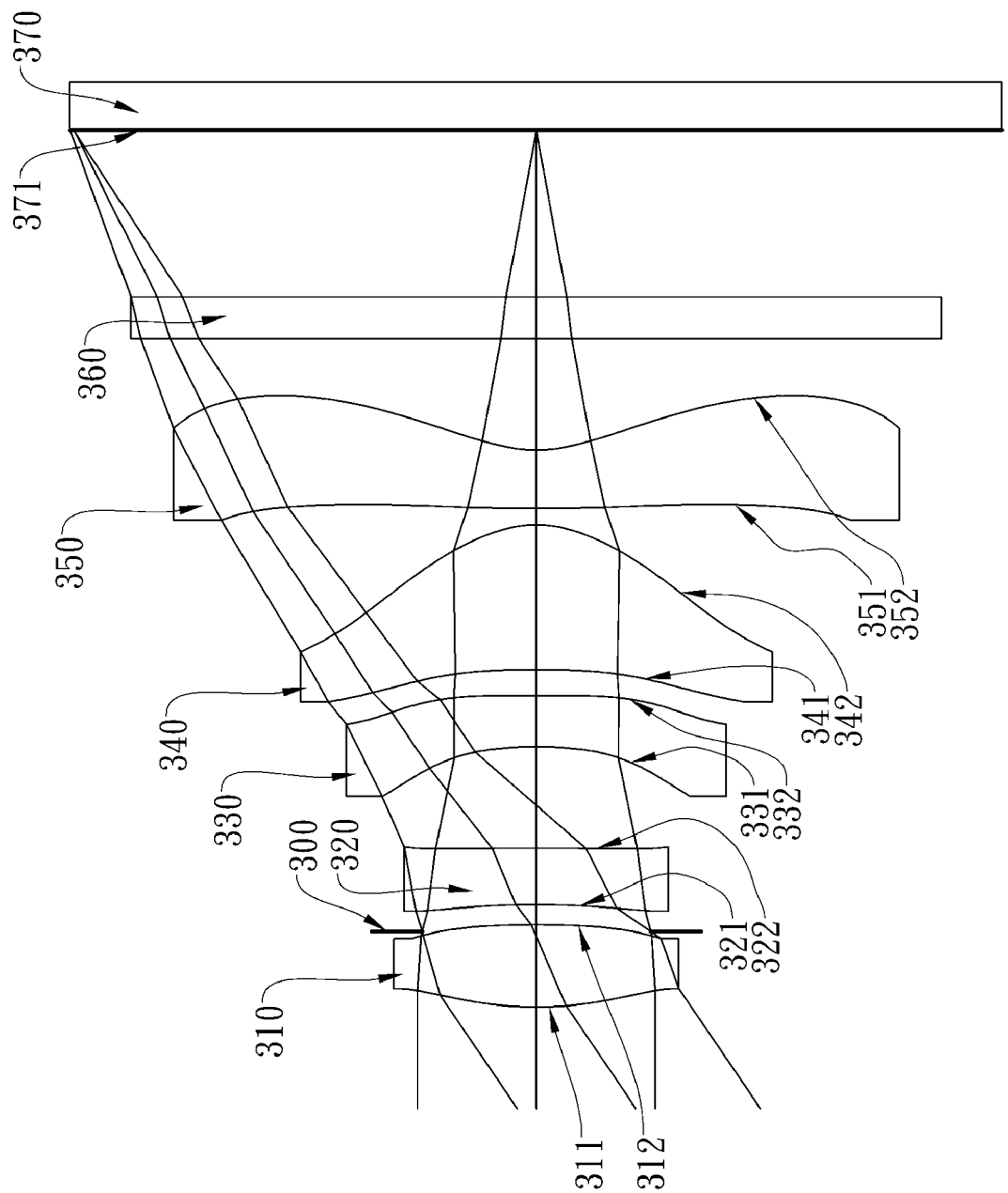
FIG. 3A shows an image capturing optical lens system in accordance with a third embodiment of the present invention.
Figure 3B:
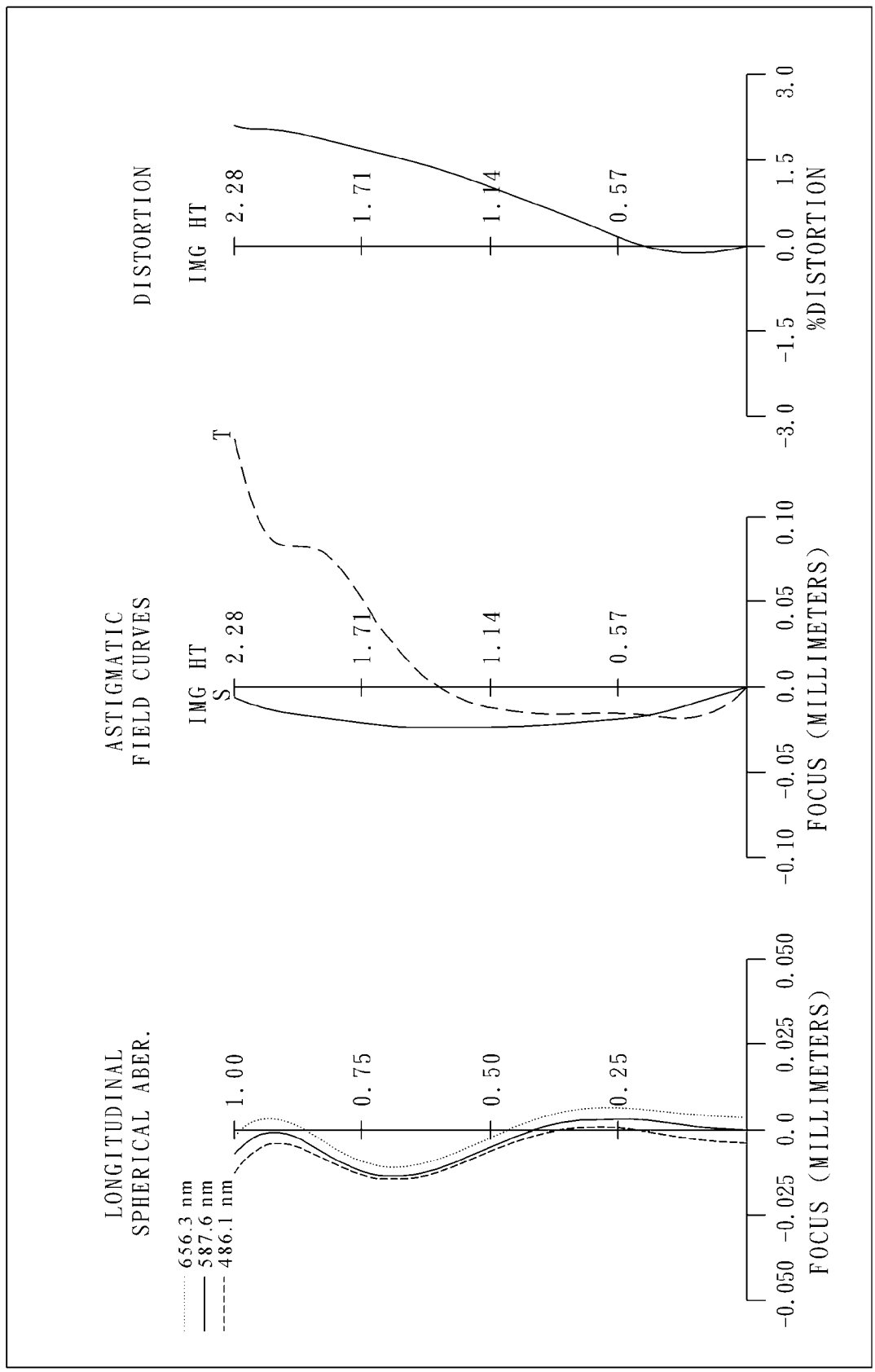
FIG. 3B shows the aberration curves of the third embodiment of the present invention.

FIG. 3A shows an image capturing optical lens system in accordance with the third embodiment of the present invention, and FIG. 3B shows the aberration curves of the third embodiment of the present invention. The image capturing optical lens system of the third embodiment of the present invention mainly comprises five lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a concave object-side surface 321 and a convex image-side surface 322, the object-side and image-side surfaces 321 and 322 thereof being aspheric;

a third lens element 330 made of plastic with negative refractive power having a concave object-side surface 331 and a concave image-side surface 332, the object-side and image-side surfaces 331 and 332 thereof being aspheric;

a fourth lens element 340 made of plastic with positive refractive power having a concave object-side surface 341 and a convex image-side surface 342, the object-side and image-side surfaces 341 and 342 thereof being aspheric; and a fifth lens element 350 made of plastic with negative refractive power having a convex object-side surface 351 and a concave image-side surface 352, the object-side and image-side surfaces 351 and 352 thereof being aspheric, and at least one inflection point is formed on both the object-side surface 351 and the image-side surface 352 thereof;

wherein an aperture stop 300 is disposed between the first lens element 310 and the second lens element 320;

the image capturing optical lens system further comprises an IR filter 360 disposed between the image-side surface 352 of the fifth lens element 350 and an image plane 371, and the IR filter 360 is made of glass and has no influence on the focal length of the image capturing optical lens system; the image capturing optical lens system further comprises an image sensor 370 provided on the image plane 371.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 3.29 mm, Fno = 2.80, HFOV = 34.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.751260 (ASP) | 0.407 | Plastic | 1.544 | 55.9 | 2.59 |
| 2 | | −6.660300 (ASP) | −0.033 | | | | |
| 3 | Ape. Stop | Plano | 0.133 | | | | |
| 4 | Lens 2 | −5.519800 (ASP) | 0.280 | Plastic | 1.634 | 23.8 | −10.62 |
| 5 | | −31.250000 (ASP) | 0.503 | | | | |
| 6 | Lens 3 | −2.102700 (ASP) | 0.252 | Plastic | 1.607 | 26.6 | −2.97 |
| 7 | | 13.106800 (ASP) | 0.130 | | | | |
| 8 | Lens 4 | −6.936700 (ASP) | 0.718 | Plastic | 1.544 | 55.9 | 1.08 |
| 9 | | −0.562300 (ASP) | 0.080 | | | | |
| 10 | Lens 5 | 8.333300 (ASP) | 0.291 | Plastic | 1.544 | 55.9 | −1.34 |
| 11 | | 0.661970 (ASP) | 0.550 | | | | |
| 12 | IR-filter | Plano | 0.210 | Glass | 1.517 | 64.2 | — |
| 13 | | Plano | 0.825 | | | | |
| 14 | Image | Plano | — | | | | |

* Reference wavelength is d-line 587.6 nm

TABLE 7

Aspheric Coefficients

| Surface # | | | | | |
|---|---|---|---|---|---|
| | 1 | 2 | 4 | 5 | 6 |
| k = | −1.19058E+01 | −4.90000E+01 | −3.63390E+01 | −3.85069E+01 | 3.70336E+00 |
| A4 = | 1.76296E−01 | −4.00600E−01 | −3.38598E−01 | −9.07143E−02 | −4.77148E−01 |
| A6 = | −4.97147E−01 | 7.10267E−01 | 1.60107E+00 | 4.06456E−01 | −2.02311E−01 |
| A8 = | 3.36502E−01 | −1.65334E+00 | −3.33248E+00 | 4.99846E−01 | 1.04828E+00 |
| A10 = | −4.50765E−01 | 1.98721E+00 | 3.81276E+00 | −2.50655E+00 | 1.20936E+00 |
| A12 = | −8.94101E−01 | −1.97396E+00 | 1.41467E+00 | 3.44439E+00 | −1.91051E+00 |
| A14 = | 1.04242E+00 | 1.49388E+00 | −4.51671E+00 | −1.14527E+00 | −6.67573E−03 |
| A16 = | −2.15777E−02 | 1.02215E−06 | 9.95514E−07 | 9.95953E−07 | |

| Surface # | | | | | |
|---|---|---|---|---|---|
| | 7 | 8 | 9 | 10 | 11 |
| k = | −2.92927E+01 | −9.78407E+00 | −3.36436E+00 | 0.00000E+00 | −6.16085E+00 |
| A4 = | −6.43523E−01 | −5.09732E−01 | −3.89047E−01 | −4.94928E−02 | −1.45204E−01 |
| A6 = | 6.94360E−01 | 9.92757E−01 | 5.04368E−01 | −1.94479E−03 | 1.09582E−01 |
| A8 = | −6.88203E−01 | −1.18008E+00 | −4.28210E−01 | 3.24772E−02 | −6.77638E−02 |
| A10 = | 8.83642E−01 | 1.11558E+00 | 4.09006E−01 | −4.32102E−02 | 2.60765E−02 |
| A12 = | −4.49658E−01 | −7.03563E−01 | −2.23287E−01 | 2.96461E−02 | −5.44936E−03 |
| A14 = | 1.95708E−02 | 2.29774E−01 | 3.42697E−02 | −1.00899E−02 | 4.50929E−04 |
| A16 = | | −2.97738E−02 | 5.01789E−03 | 1.30658E−03 | |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| | | | |
|---|---|---|---|
| f | 3.29 | f3/f | −0.90 |
| Fno | 2.80 | f2/f3 | 3.58 |
| HFOV | 34.2 | f/f4 | 3.04 |
| (V2 + V3)/V1 | 0.90 | f/f5 | −2.46 |
| (T12 + T34)/T23 | 0.46 | (|f4| + |f5|)/(|f2| + |f3|) | 0.18 |
| CT2/CT3 | 1.11 | $\tan^{-1}$(ImgH/f) | 34.77 |
| R1/R2 | −0.26 | Sd/Td | 0.86 |
| |R7/R8| | 12.34 | TTL/ImgH | 1.87 |
| R8/R10 | −0.85 | | |

Embodiment 4

Figure 4A:
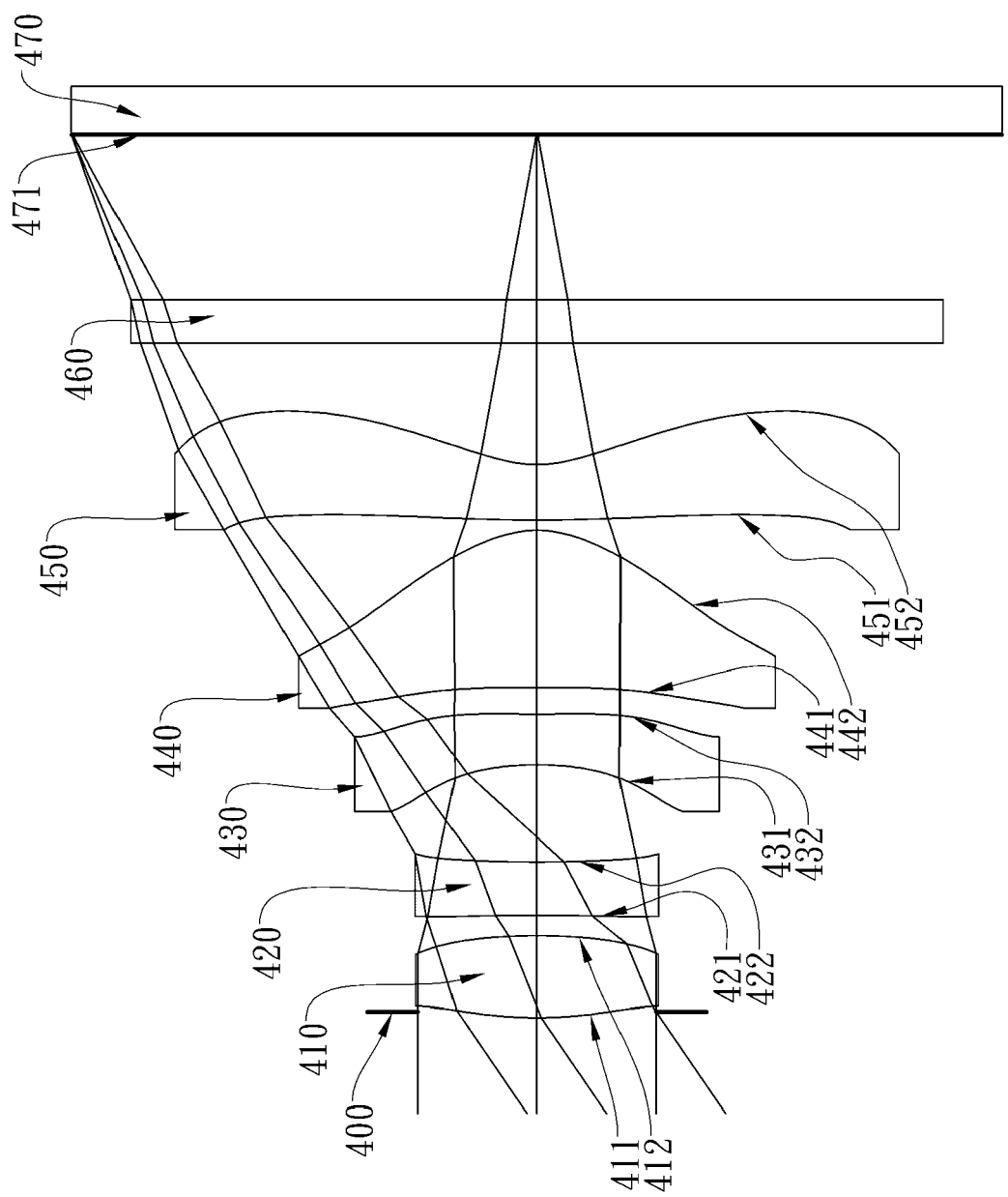
FIG. 4A shows an image capturing optical lens system in accordance with a fourth embodiment of the present invention.
Figure 4B:
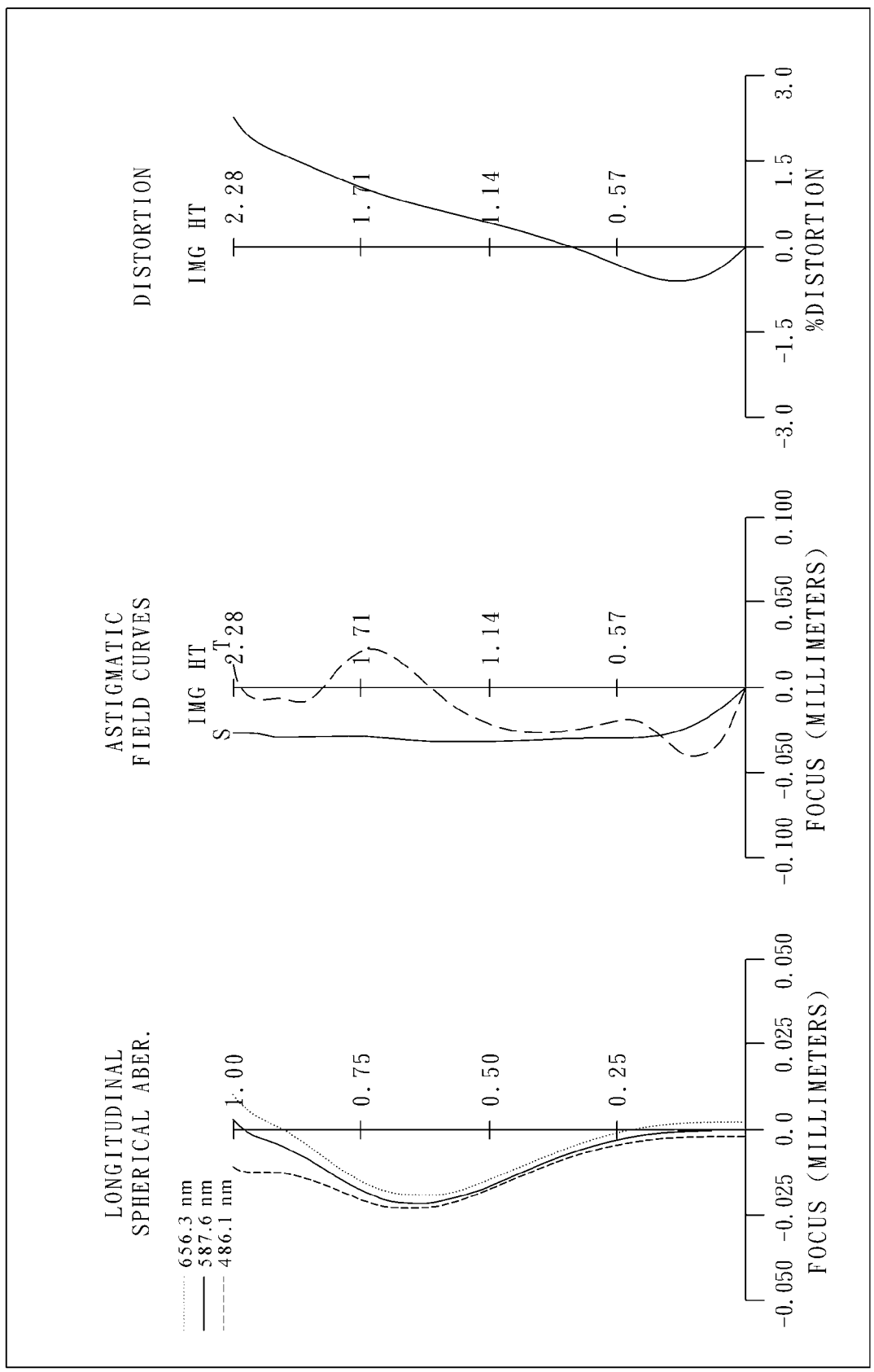
FIG. 4B shows the aberration curves of the fourth embodiment of the present invention.

FIG. 4A shows an image capturing optical lens system in accordance with the fourth embodiment of the present invention, and FIG. 4B shows the aberration curves of the fourth embodiment of the present invention. The image capturing optical lens system of the fourth embodiment of the present invention mainly comprises five lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a concave image-side surface 422, the object-side and image-side surfaces 421 and 422 thereof being aspheric;

a third lens element 430 made of plastic with negative refractive power having a concave object-side surface 431 and a concave image-side surface 432, the object-side and image-side surfaces 431 and 432 thereof being aspheric;

a fourth lens element 440 made of plastic with positive refractive power having a convex object-side surface 441 and a convex image-side surface 442, the object-side and image-side surfaces 441 and 442 thereof being aspheric; and a fifth lens element 450 made of plastic with negative refractive power having a convex object-side surface 451 and a concave image-side surface 452, the object-side and image-side surfaces 451 and 452 thereof being aspheric, and at least one inflection point is formed on both the object-side surface 451 and the image-side surface 452 thereof;

wherein an aperture stop 400 is disposed between an imaged object and the first lens element 410;

the image capturing optical lens system further comprises an IR filter 460 disposed between the image-side surface 452 of the fifth lens element 450 and an image plane 471, and the IR filter 460 is made of glass and has no influence on the focal length of the image capturing optical lens system; the image capturing optical lens system further comprises an image sensor 470 provided on the image plane 471.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 3.27 mm, Fno = 2.80, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.030 | | | | |
| 2 | Lens 1 | 1.975210 (ASP) | 0.403 | Plastic | 1.543 | 56.5 | 2.41 |
| 3 | | −3.605100 (ASP) | 0.100 | | | | |
| 4 | Lens 2 | −25.000000 (ASP) | 0.263 | Plastic | 1.634 | 23.8 | −7.78 |
| 5 | | 6.171800 (ASP) | 0.478 | | | | |
| 6 | Lens 3 | −1.673900 (ASP) | 0.250 | Plastic | 1.583 | 30.2 | −2.36 |
| 7 | | 8.187300 (ASP) | 0.130 | | | | |
| 8 | Lens 4 | 57.119700 (ASP) | 0.775 | Plastic | 1.543 | 56.5 | 0.95 |
| 9 | | −0.518310 (ASP) | 0.050 | | | | |
| 10 | Lens 5 | 7.575800 (ASP) | 0.271 | Plastic | 1.543 | 56.5 | −1.18 |
| 11 | | 0.581950 (ASP) | 0.600 | | | | |
| 12 | IR-filter | Plano | 0.210 | Glass | 1.517 | 64.2 | — |
| 13 | | Plano | 0.812 | | | | |
| 14 | Image | Plano | — | | | | |

\* Reference wavelength is d-line 587.6 nm
\* Effective radius of surface 11 is 1.78 mm

TABLE 10

Aspheric Coefficients

| | Surface # | | | | |
|---|---|---|---|---|---|
| | 2 | 3 | 4 | 5 | 6 |
| k = | −1.72305E+01 | −3.08188E+01 | 3.90000E+01 | −5.77705E+00 | 2.76316E+00 |
| A4 = | 1.30523E−01 | −4.38557E−01 | −2.36879E−01 | −9.07114E−02 | −5.10127E−01 |
| A6 = | −6.42990E−01 | 4.18031E−01 | 1.20894E+00 | 4.76609E−01 | −1.79761E−01 |
| A8 = | 1.23378E−01 | −1.19310E+00 | −2.25052E+00 | 2.16790E−02 | 1.47074E+00 |

TABLE 10-continued

| Aspheric Coefficients | | | | |
|---|---|---|---|---|
| A10 = | −3.48763E−01 | 1.66047E+00 | 3.09217E+00 | −8.10168E−01 | 1.63251E+00 |
| A12 = | −8.94099E−01 | −1.97396E+00 | 1.41467E+00 | 3.44439E+00 | −1.91051E+00 |
| A14 = | 1.04242E+00 | 1.49388E+00 | −4.51671E+00 | −1.14527E+00 | −6.67521E−03 |
| A16 = | −2.15783E−02 | 1.39810E−06 | 1.37237E−06 | 1.37274E−06 | |

| | Surface # | | | | |
|---|---|---|---|---|---|
| | 7 | 8 | 9 | 10 | 11 |
| k = | −3.89341E+01 | 1.50000E+00 | −3.65923E+00 | 0.00000E+00 | −6.44925E+00 |
| A4 = | −7.04396E−01 | −5.02171E−01 | −3.85576E−01 | −5.31500E−02 | −1.48232E−01 |
| A6 = | 7.97928E−01 | 9.73442E−01 | 5.24647E−01 | 6.68137E−03 | 1.07032E−01 |
| A8 = | −6.88474E−01 | −1.17720E+00 | −4.30363E−01 | 2.96752E−02 | −6.55926E−02 |
| A10 = | 8.45855E−01 | 1.11279E+00 | 4.01176E−01 | −4.37037E−02 | 2.57228E−02 |
| A12 = | −4.54501E−01 | −7.12540E−01 | −2.27882E−01 | 2.97681E−02 | −5.54750E−03 |
| A14 = | 4.48958E−02 | 2.22768E−01 | 3.40280E−02 | −1.00171E−02 | 4.62779E−04 |
| A16 = | | −2.15543E−02 | 6.48657E−03 | 1.27368E−03 | |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 3.27 | f3/f | −0.72 |
|---|---|---|---|
| Fno | 2.80 | f2/f3 | 3.30 |
| HFOV | 34.4 | f/f4 | 3.45 |
| (V2 + V3)/V1 | 0.96 | f/f5 | −2.78 |
| (T12 + T34)/T23 | 0.48 | (|f4| + |f5|)/(|f2| + |f3|) | 0.21 |
| CT2/CT3 | 1.05 | tan$^{-1}$(ImgH/f) | 34.91 |
| R1/R2 | −0.55 | Sd/Td | 0.99 |
| |R7/R8| | 110.20 | TTL/ImgH | 1.87 |
| R8/R10 | −0.89 | | |

Embodiment 5

Figure 5A:
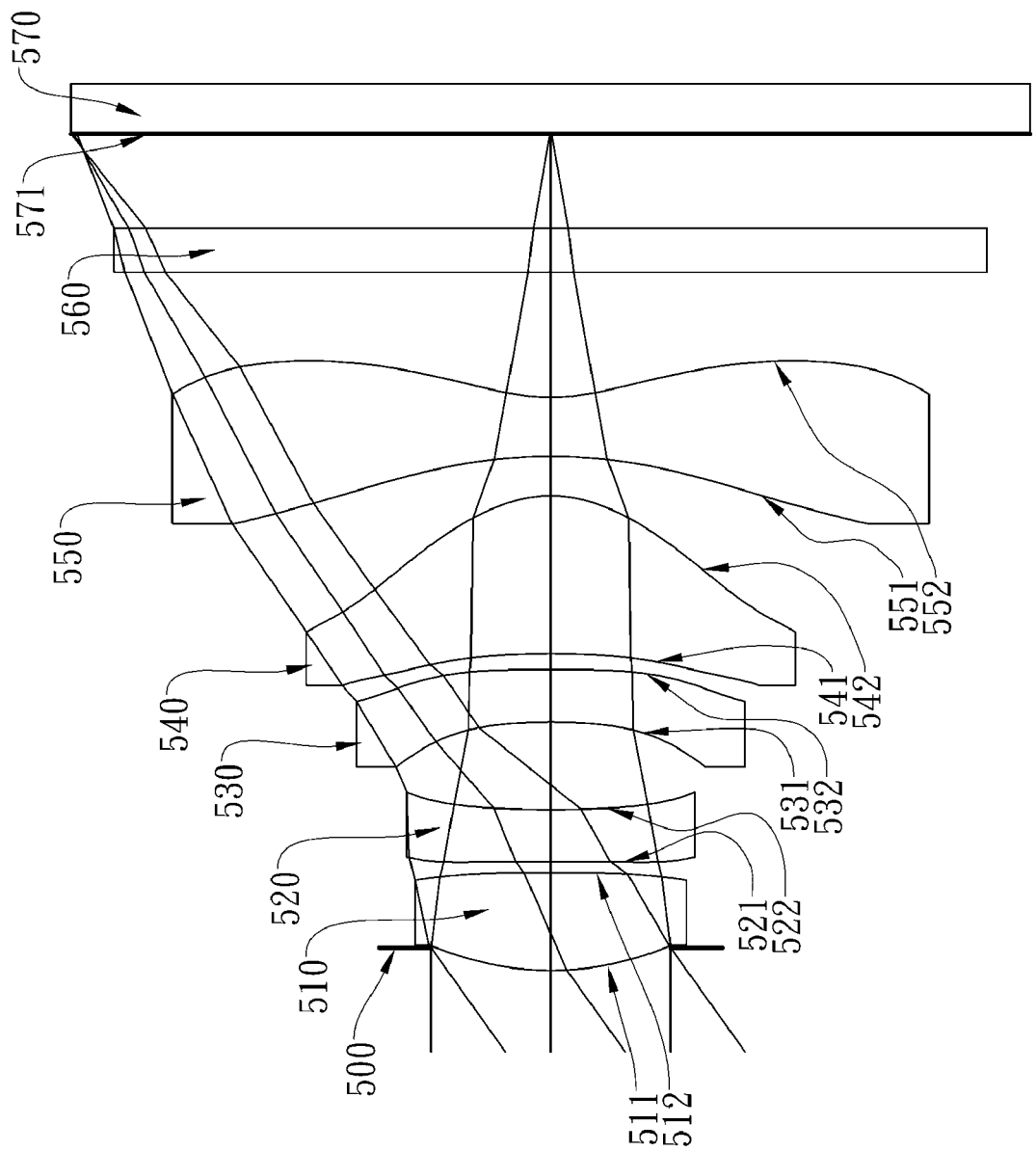
FIG. 5A shows an image capturing optical lens system in accordance with a fifth embodiment of the present invention.
Figure 5B:
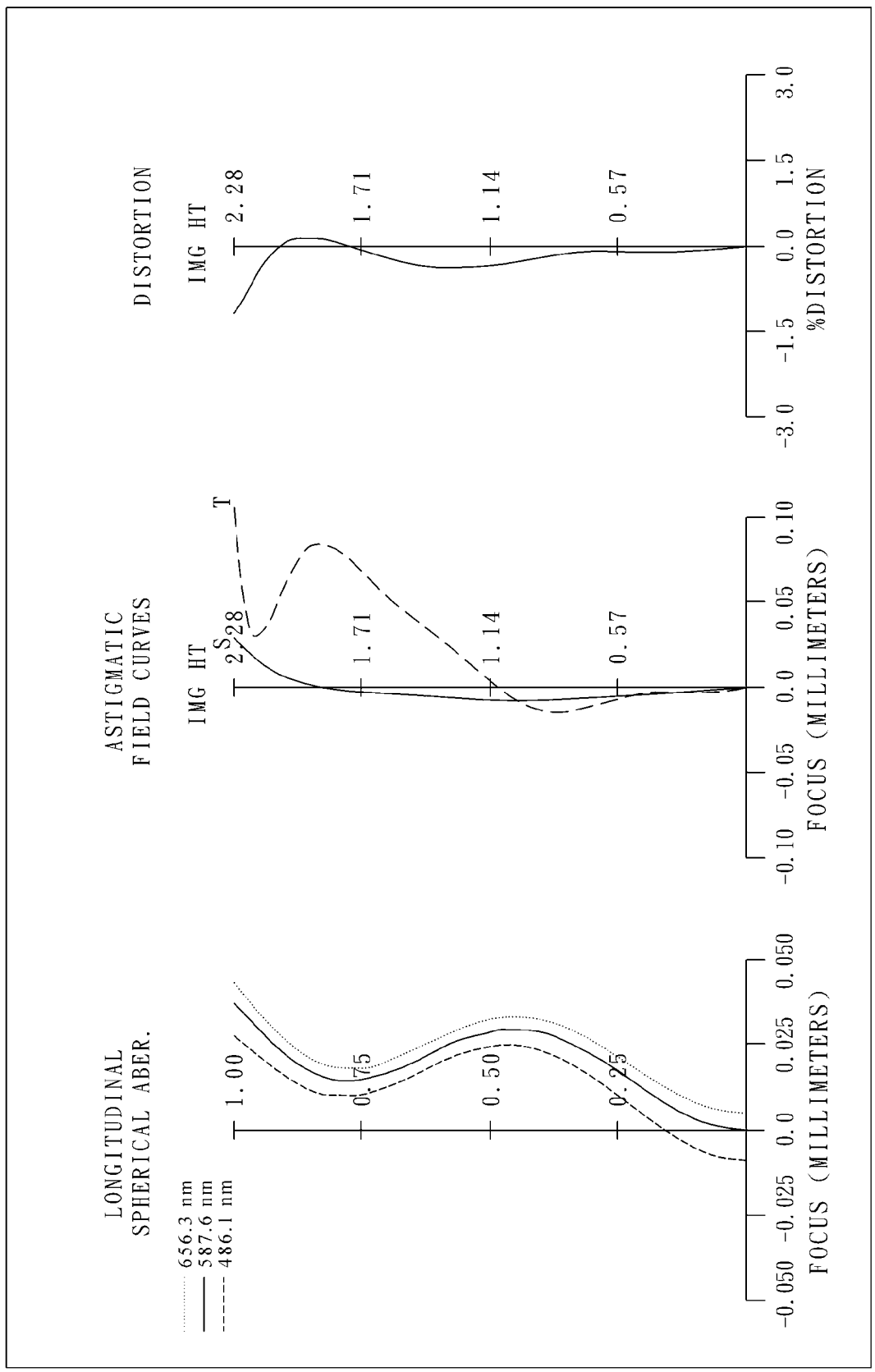
FIG. 5B shows the aberration curves of the fifth embodiment of the present invention.

FIG. 5A shows an image capturing optical lens system in accordance with the fifth embodiment of the present invention, and FIG. 5B shows the aberration curves of the fifth embodiment of the present invention. The image capturing optical lens system of the fifth embodiment of the present invention mainly comprises five lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a convex object-side surface 521 and a concave image-side surface 522, the object-side and image-side surfaces 521 and 522 thereof being aspheric;

a third lens element 530 made of plastic with negative refractive power having a concave object-side surface 531 and a convex image-side surface 532, the object-side and image-side surfaces 531 and 532 thereof being aspheric;

a fourth lens element 540 made of plastic with positive refractive power having a concave object-side surface 541 and a convex image-side surface 542, the object-side and image-side surfaces 541 and 542 thereof being aspheric; and a fifth lens element 550 made of plastic with negative refractive power having a concave object-side surface 551 and a concave image-side surface 552, the object-side and image-side surfaces 551 and 552 thereof being aspheric, and at least one inflection point is formed on the image-side surface 552 thereof;

wherein an aperture stop 500 is disposed between an imaged object and the first lens element 510;

the image capturing optical lens system further comprises an IR filter 560 disposed between the image-side surface 552 of the fifth lens element 550 and an image plane 571, and the IR filter 560 is made of glass and has no influence on the focal length of the image capturing optical lens system; the image capturing optical lens system further comprises an image sensor 570 provided on the image plane 571.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 3.22 mm, Fno = 2.80, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.108 | | | | |
| 2 | Lens 1 | 1.359740 (ASP) | 0.469 | Plastic | 1.535 | 56.3 | 2.51 |
| 3 | | −94.580500 (ASP) | 0.052 | | | | |
| 4 | Lens 2 | 64.930100 (ASP) | 0.250 | Plastic | 1.634 | 23.8 | −8.56 |
| 5 | | 4.999500 (ASP) | 0.420 | | | | |
| 6 | Lens 3 | −2.838600 (ASP) | 0.251 | Plastic | 1.634 | 23.8 | −4.62 |
| 7 | | −95.522400 (ASP) | 0.078 | | | | |

TABLE 12-continued (Embodiment 5)
f = 3.22 mm, Fno = 2.80, HFOV = 35.6 deg.

| Surface # | | Curvature Radius | Thickness | Material | Index | Abbe # | Focal length |
|---|---|---|---|---|---|---|---|
| 8 | Lens 4 | −5.939000 (ASP) | 0.758 | Plastic | 1.544 | 55.9 | 1.15 |
| 9 | | −0.593110 (ASP) | 0.189 | | | | |
| 10 | Lens 5 | −2.387010 (ASP) | 0.283 | Plastic | 1.544 | 55.9 | −1.17 |
| 11 | | 0.900160 (ASP) | 0.600 | | | | |
| 12 | IR-filter | Plano | 0.210 | Glass | 1.517 | 64.2 | — |
| 13 | | Plano | 0.454 | | | | |
| 14 | Image | Plano | — | | | | |

* Reference wavelength is d-line 587.6 nm

TABLE 13

Aspheric Coefficients

| | Surface # | | | | |
|---|---|---|---|---|---|
| | 2 | 3 | 4 | 5 | 6 |
| k = | −7.08420E+00 | 3.71250E+01 | 9.59063E+01 | 4.07822E+01 | 1.25837E+01 |
| A4 = | 2.92689E−01 | −4.51557E−01 | −3.84043E−01 | −2.09728E−02 | −2.51313E−01 |
| A6 = | −4.37362E−01 | 1.34542E+00 | 2.05106E+00 | 2.85486E−02 | −5.70087E−01 |
| A8 = | 2.94062E−01 | −2.64066E+00 | −4.05797E+00 | 1.57366E+00 | 3.88055E−01 |
| A10 = | −1.84393E−01 | 2.75330E+00 | 4.27879E+00 | −3.78660E+00 | 2.46156E+00 |
| A12 = | −8.93290E−01 | −1.91786E+00 | 1.34808E+00 | 3.44998E+00 | −1.89729E+00 |
| A14 = | 1.03635E+00 | 1.49388E+00 | −4.51671E+00 | −1.14527E+00 | −6.67712E−03 |
| A16 = | −5.47096E−03 | 6.65262E−08 | 5.16376E−08 | 5.93850E−08 | |

| | Surface # | | | | |
|---|---|---|---|---|---|
| | 7 | 8 | 9 | 10 | 11 |
| k = | −4.84375E+01 | −1.16488E+01 | −2.91635E+00 | 0.00000E+00 | −8.95189E+00 |
| A4 = | −4.32233E−01 | −4.76871E−01 | −3.78268E−01 | 1.66625E−02 | −1.70531E−01 |
| A6 = | 3.71025E−01 | 1.02873E+00 | 4.78088E−01 | 9.83717E−03 | 1.32212E−01 |
| A8 = | −6.02643E−01 | −1.22237E+00 | −4.12211E−01 | 3.31263E−02 | −7.28294E−02 |
| A10 = | 1.01540E+00 | 1.08665E+00 | 4.18492E−01 | −4.61935E−02 | 2.61277E−02 |
| A12 = | −5.13526E−01 | −6.85338E−01 | −2.21587E−01 | 2.93474E−02 | −5.48836E−03 |
| A14 = | −1.16024E−02 | 2.46794E−01 | 2.91292E−02 | −9.79540E−03 | 4.87703E−04 |
| A16 = | | −5.20320E−02 | 4.15633E−03 | 1.34119E−03 | |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f | 3.22 | f3/f | −1.44 |
|---|---|---|---|
| Fno | 2.80 | f2/f3 | 1.85 |
| HFOV | 35.6 | f/f4 | 2.79 |
| (V2 + V3)/V1 | 0.85 | f/f5 | −2.76 |
| (T12 + T34)/T23 | 0.31 | (|f4| + |f5|)/(|f2| + |f3|) | 0.18 |
| CT2/CT3 | 1.00 | tan⁻¹(ImgH/f) | 35.36 |
| R1/R2 | −0.01 | Sd/Td | 0.96 |
| |R7/R8| | 10.01 | TTL/ImgH | 1.73 |
| R8/R10 | −0.66 | | |

Embodiment 6

Figure 6A:
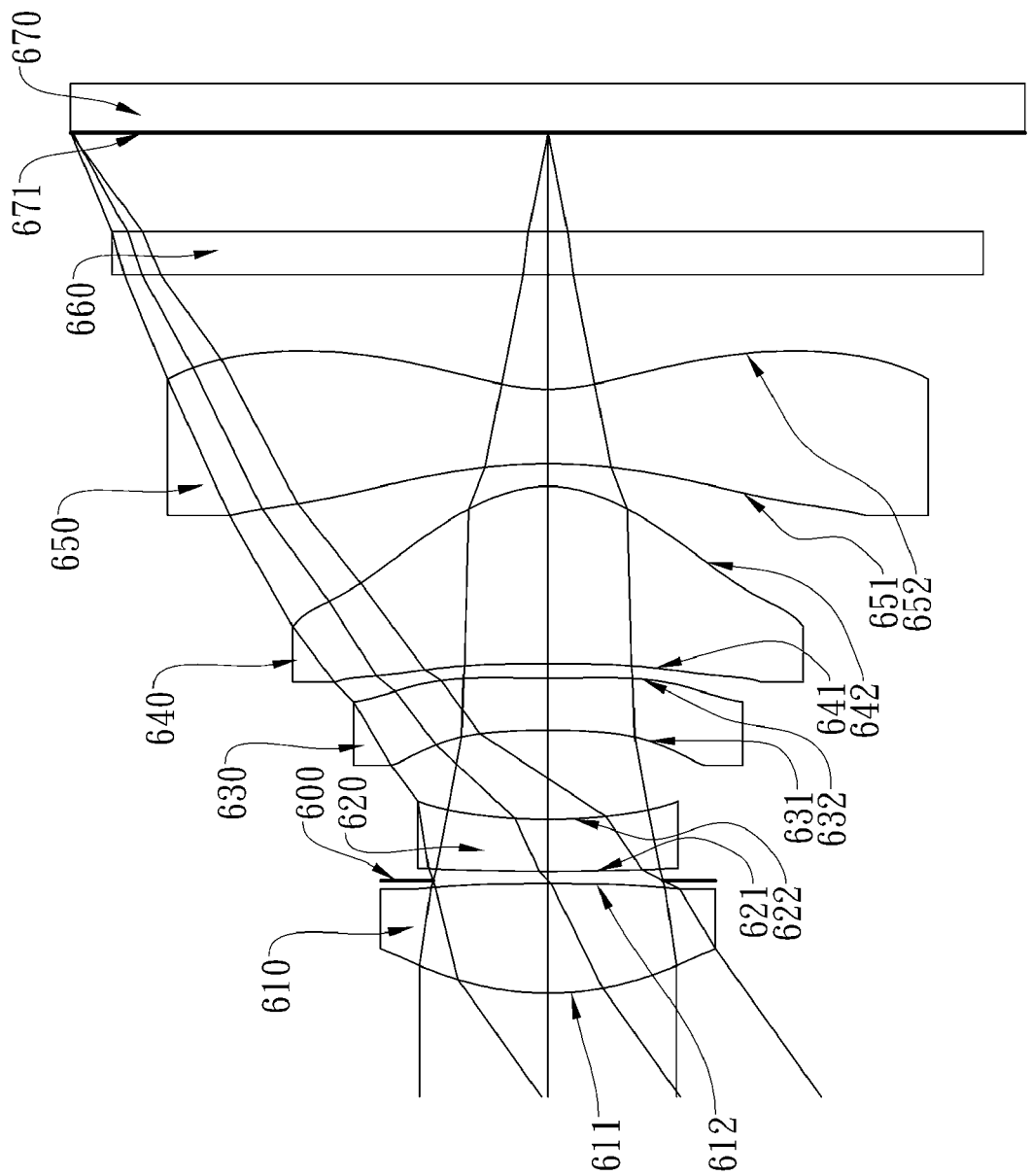
FIG. 6A shows an image capturing optical lens system in accordance with a sixth embodiment of the present invention.
Figure 6B:
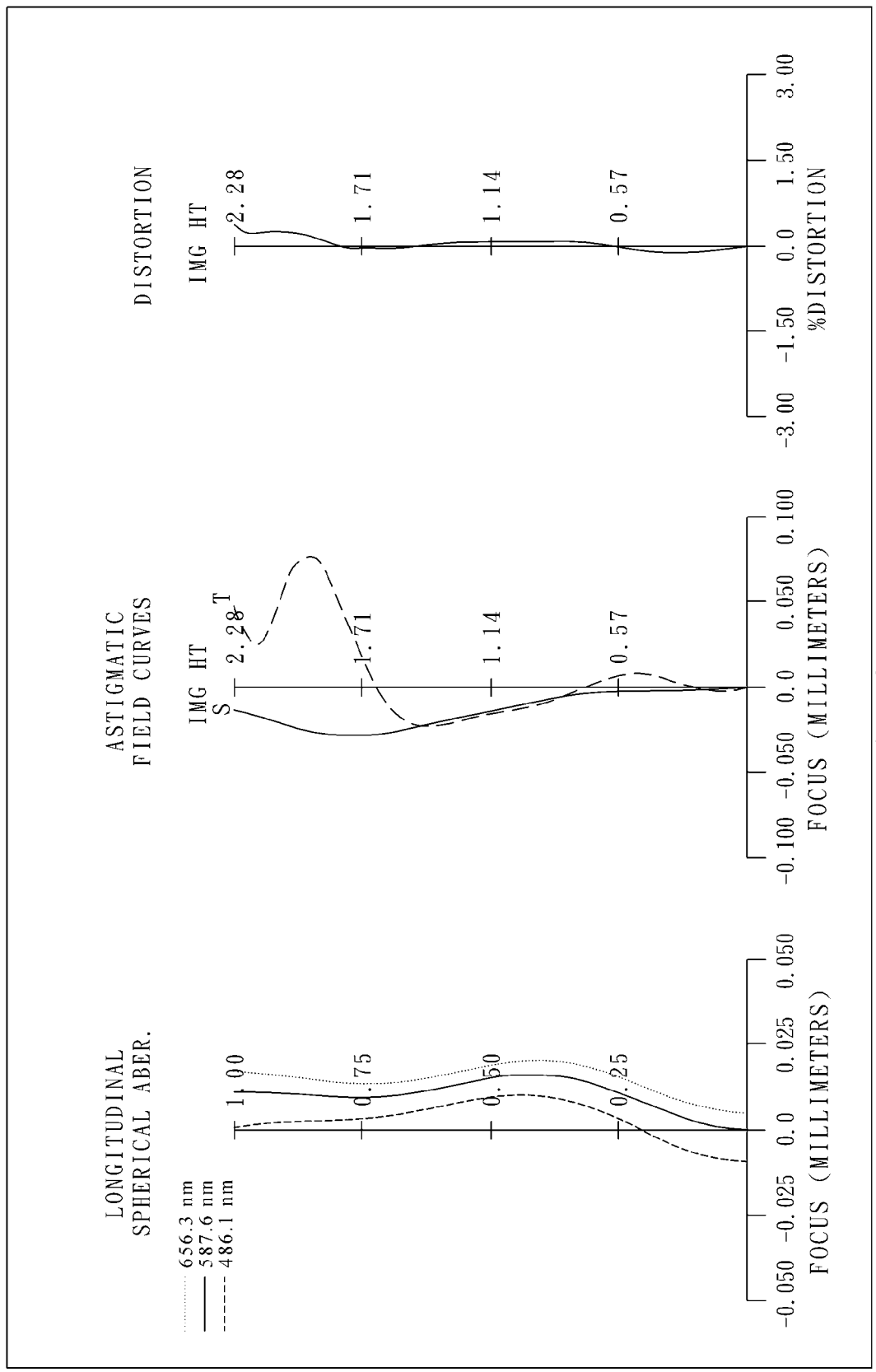
FIG. 6B shows the aberration curves of the sixth embodiment of the present invention.

FIG. 6A shows an image capturing optical lens system in accordance with the sixth embodiment of the present invention, and FIG. 6B shows the aberration curves of the sixth embodiment of the present invention. The image capturing optical lens system of the sixth embodiment of the present invention mainly comprises five lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a convex object-side surface 621 and a concave image-side surface 622, the object-side and image-side surfaces 621 and 622 thereof being aspheric;

a third lens element 630 made of plastic with negative refractive power having a concave object-side surface 631 and a concave image-side surface 632, the object-side and image-side surfaces 631 and 632 thereof being aspheric;

a fourth lens element 640 made of plastic with positive refractive power having a concave object-side surface 641 and a convex image-side surface 642, the object-side and image-side surfaces 641 and 642 thereof being aspheric; and a fifth lens element 650 made of plastic with negative refractive power having a concave object-side surface 651 and a concave image-side surface 652, the object-side and image-side surfaces 651 and 652 thereof being aspheric, and at least one inflection point is formed on the image-side surface 652 thereof;

wherein an aperture stop 600 is disposed between the first lens element 610 and the second lens element 620;

the image capturing optical lens system further comprises an IR filter 660 disposed between the image-side surface 652 of the fifth lens element 650 and an image plane 671, and the IR filter 660 is made of glass and has no influence on the focal length of the image capturing optical lens system; the image capturing optical lens system further comprises an image sensor 670 provided on the image plane 671.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| (Embodiment 6) | | | |
|---|---|---|---|
| f | 3.19 | f3/f | −1.44 |
| Fno | 2.60 | f2/f3 | 1.35 |
| HFOV | 35.4 | f/f4 | 2.94 |

TABLE 15

(Embodiment 6)
f = 3.19 mm, Fno = 2.60, HFOV = 35.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.432950 (ASP) | 0.528 | Plastic | 1.544 | 55.9 | 2.57 |
| 2 | | −52.705700 (ASP) | 0.015 | | | | |
| 3 | Ape. Stop | Plano | 0.045 | | | | |
| 4 | Lens 2 | 7.061600 (ASP) | 0.250 | Plastic | 1.640 | 23.3 | −6.17 |
| 5 | | 2.498260 (ASP) | 0.431 | | | | |
| 6 | Lens 3 | −4.239000 (ASP) | 0.250 | Plastic | 1.583 | 30.2 | −4.58 |
| 7 | | 7.403700 (ASP) | 0.070 | | | | |
| 8 | Lens 4 | −97.651300 (ASP) | 0.856 | Plastic | 1.544 | 55.9 | 1.09 |
| 9 | | −0.589200 (ASP) | 0.109 | | | | |
| 10 | Lens 5 | −2.630830 (ASP) | 0.359 | Plastic | 1.535 | 56.3 | −1.17 |
| 11 | | 0.862560 (ASP) | 0.550 | | | | |
| 12 | IR-filter | Plano | 0.210 | Glass | 1.517 | 64.2 | — |
| 13 | | Plano | 0.475 | | | | |
| 14 | Image | Plano | — | | | | |

* Reference wavelength is d-line 587.6 nm

TABLE 16

Aspheric Coefficients

| | Surface # | | | | |
|---|---|---|---|---|---|
| | 1 | 2 | 4 | 5 | 6 |
| k = | −7.65156E+00 | −1.00000E+00 | −1.00000E+00 | −5.65143E−01 | 1.20307E+01 |
| A4 = | 2.97823E−01 | −3.66896E−01 | −4.25115E−01 | −9.71402E−02 | −3.07523E−01 |
| A6 = | −4.16867E−01 | 1.25277E+00 | 1.89048E+00 | 2.36557E−01 | −6.22309E−01 |
| A8 = | 3.48538E−01 | −2.70328E+00 | −3.84059E+00 | 1.40692E+00 | 4.65506E−01 |
| A10 = | 1.95057E−01 | 3.37099E+00 | 4.36247E+00 | −4.20303E+00 | 2.40956E+00 |
| A12 = | −1.21037E+00 | −3.00849E+00 | 3.15948E−01 | 4.79622E+00 | −2.51988E+00 |
| A14 = | 1.02310E+00 | 2.67001E+00 | −6.95011E−01 | −4.58206E−01 | 6.83238E−01 |
| A16 = | −1.19755E−01 | −1.08741E+00 | 6.85884E+00 | −2.73780E−01 | |

| | Surface # | | | | |
|---|---|---|---|---|---|
| | 7 | 8 | 9 | 10 | 11 |
| k = | −1.86198E+01 | −1.00000E+00 | −3.17859E+00 | −1.00000E+00 | −9.19941E+00 |
| A4 = | −4.86429E−01 | −4.62613E−01 | −3.52424E−01 | 2.17224E−02 | −1.49123E−01 |
| A6 = | 3.93367E−01 | 9.97127E−01 | 4.74387E−01 | 6.80924E−03 | 1.15992E−01 |
| A8 = | −5.84639E−01 | −1.21777E+00 | −4.17172E−01 | 3.23102E−02 | −6.89489E−02 |
| A10 = | 1.00060E+00 | 1.10602E+00 | 4.17674E−01 | −4.61157E−02 | 2.59581E−02 |
| A12 = | −5.58356E−01 | −6.74293E−01 | −2.22559E−01 | 2.96884E−02 | −5.37592E−03 |
| A14 = | 4.95025E−02 | 2.26875E−01 | 2.96937E−02 | −9.79474E−03 | 4.53625E−04 |
| A16 = | | −4.98836E−02 | 3.66428E−03 | 1.27148E−03 | |

TABLE 17-continued (Embodiment 6)

| (V2 + V3)/V1 | 0.96 | f/f5 | −2.72 |
|---|---|---|---|
| (T12 + T34)/T23 | 0.30 | (|f4| + |f5|)/(|f2| + |f3|) | 0.21 |
| CT2/CT3 | 1.00 | tan⁻¹(ImgH/f) | 35.61 |
| R1/R2 | −0.03 | Sd/Td | 0.81 |
| |R7/R8| | 165.74 | TTL/ImgH | 1.78 |
| R8/R10 | −0.68 | | |

Embodiment 7

Figure 7A:
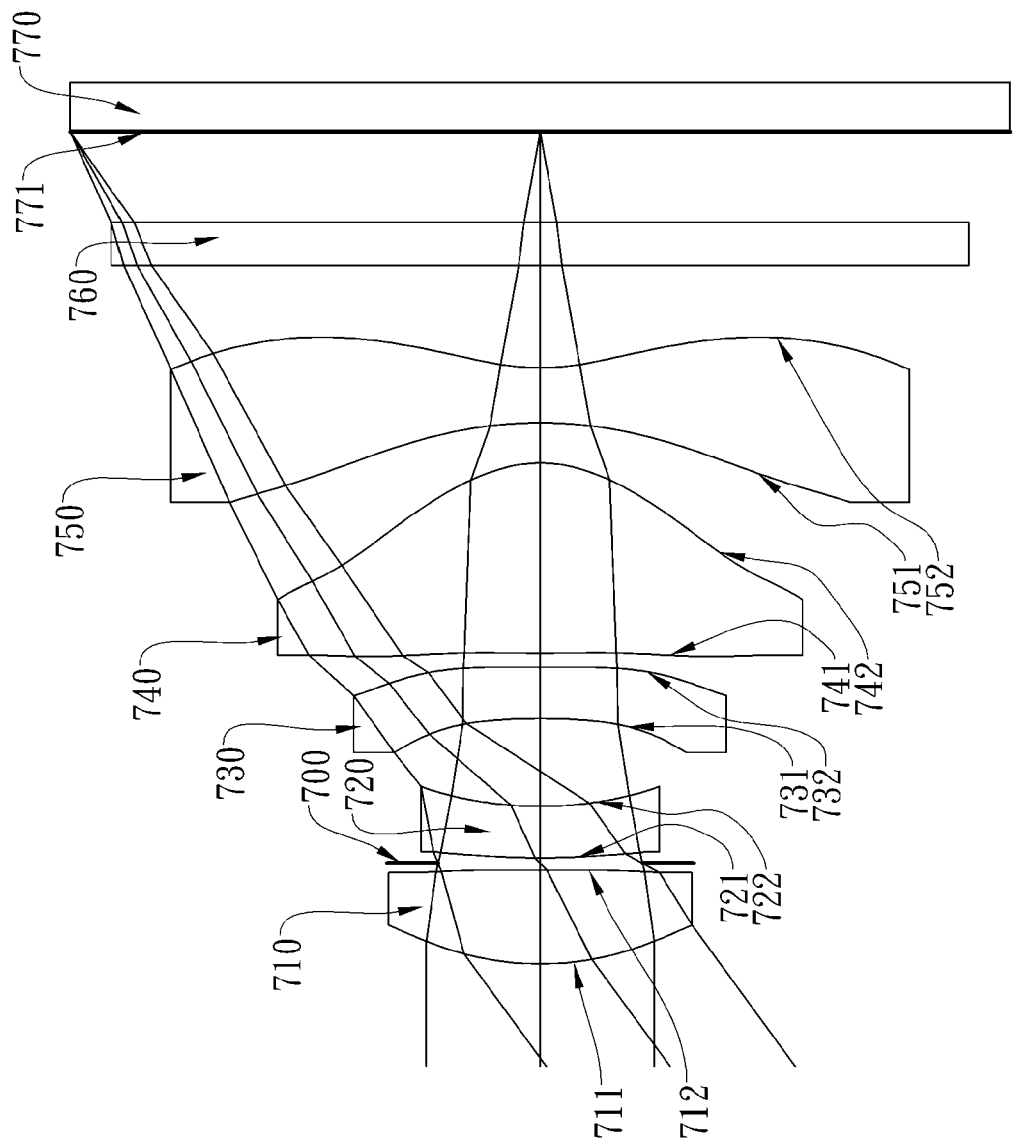
FIG. 7A shows an image capturing optical lens system in accordance with a seventh embodiment of the present invention.
Figure 7B:
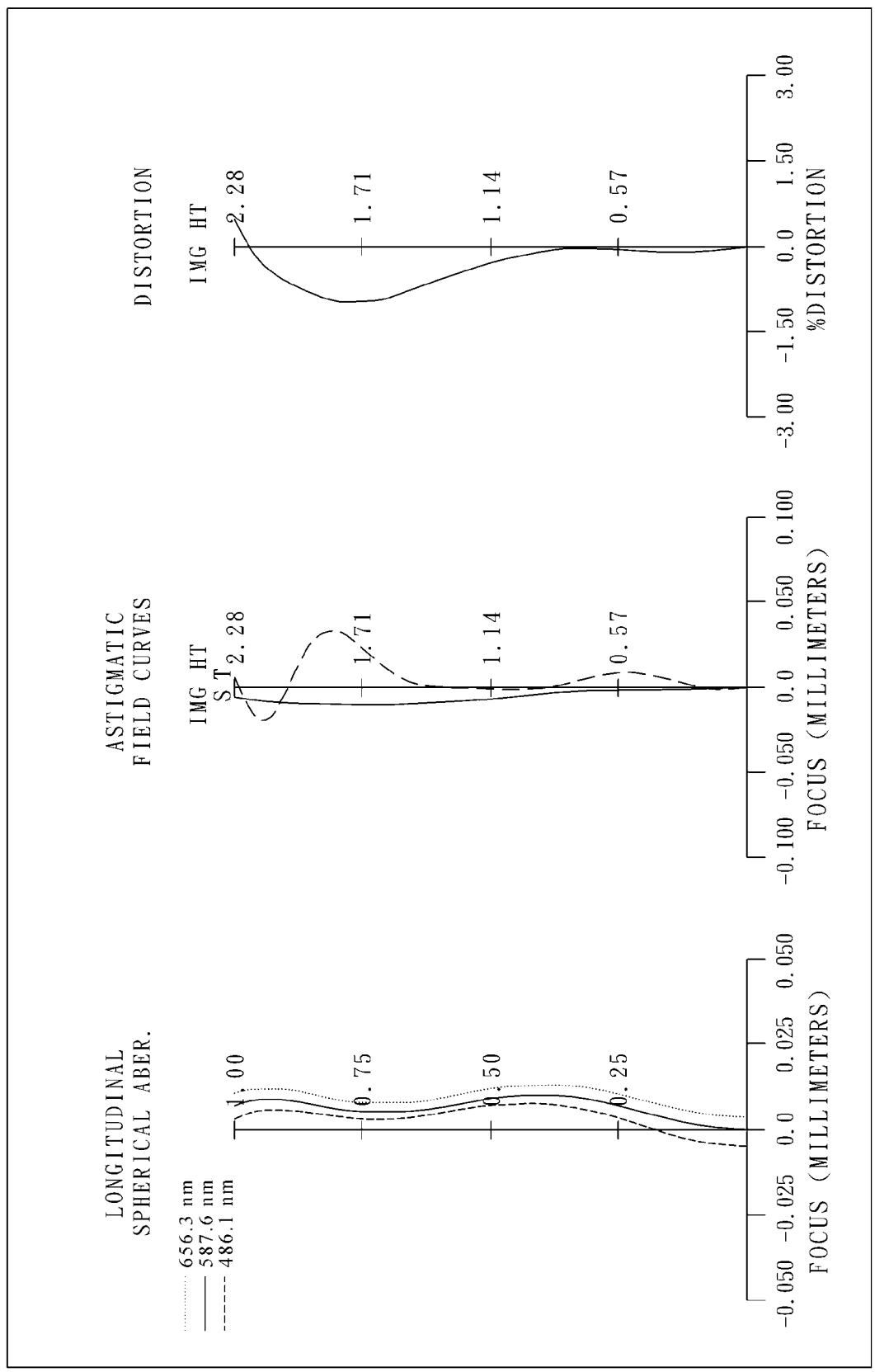
FIG. 7B shows the aberration curves of the seventh embodiment of the present invention.

FIG. 7A shows an image capturing optical lens system in accordance with the seventh embodiment of the present invention, and FIG. 7B shows the aberration curves of the seventh embodiment of the present invention. The image capturing optical lens system of the seventh embodiment of the present invention mainly comprises five lens elements, in order from an object side to an image side:

a first lens element 710 made of plastic with positive refractive power having a convex object-side surface 711 and a concave image-side surface 712, the object-side and image-side surfaces 711 and 712 thereof being aspheric;

a second lens element 720 made of plastic with negative refractive power having a convex object-side surface 721 and a concave image-side surface 722, the object-side and image-side surfaces 721 and 722 thereof being aspheric;

a third lens element 730 made of plastic with negative refractive power having a concave object-side surface 731 and a concave image-side surface 732, the object-side and image-side surfaces 731 and 732 thereof being aspheric;

a fourth lens element 740 made of plastic with positive refractive power having a convex object-side surface 741 and a convex image-side surface 742, the object-side and image-side surfaces 741 and 742 thereof being aspheric; and a fifth lens element 750 made of plastic with negative refractive power having a concave object-side surface 751 and a concave image-side surface 752, the object-side and image-side surfaces 751 and 752 thereof being aspheric, and at least one inflection point is formed on the image-side surface 752 thereof;

wherein an aperture stop 700 is disposed between the first lens element 710 and the second lens element 720;

the image capturing optical lens system further comprises an IR filter 760 disposed between the image-side surface 752 of the fifth lens element 750 and an image plane 771, and the IR filter 760 is made of glass and has no influence on the focal length of the image capturing optical lens system; the image capturing optical lens system further comprises an image sensor 770 provided on the image plane 771.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 3.11 mm, Fno = 2.80, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.412720 (ASP) | 0.457 | Plastic | 1.544 | 55.9 | 2.71 |
| 2 | | 29.311100 (ASP) | 0.034 | | | | |
| 3 | Ape. Stop | Plano | 0.026 | | | | |
| 4 | Lens 2 | 3.176400 (ASP) | 0.251 | Plastic | 1.640 | 23.3 | −6.27 |
| 5 | | 1.718210 (ASP) | 0.428 | | | | |
| 6 | Lens 3 | −3.712900 (ASP) | 0.250 | Plastic | 1.633 | 23.4 | −4.62 |
| 7 | | 14.145700 (ASP) | 0.070 | | | | |
| 8 | Lens 4 | 9.469900 (ASP) | 0.928 | Plastic | 1.544 | 55.9 | 1.12 |
| 9 | | −0.630790 (ASP) | 0.196 | | | | |
| 10 | Lens 5 | −2.008810 (ASP) | 0.267 | Plastic | 1.535 | 56.3 | −1.20 |
| 11 | | 0.982330 (ASP) | 0.500 | | | | |
| 12 | IR-filter | Plano | 0.210 | Glass | 1.517 | 64.2 | — |
| 13 | | Plano | 0.442 | | | | |
| 14 | Image | Plano | — | | | | |

* Reference wavelength is d-line 587.6 nm

TABLE 19

Aspheric Coefficients

| | Surface # | | | | |
|---|---|---|---|---|---|
| | 1 | 2 | 4 | 5 | 6 |
| k = | −7.68757E+00 | −1.00000E+00 | −1.00000E+00 | −1.94488E+00 | 1.65886E+01 |
| A4 = | 3.15647E−01 | −3.32685E−01 | −4.29022E−01 | −1.24510E−01 | −3.02003E−01 |
| A6 = | −4.21722E−01 | 1.08713E+00 | 1.64055E+00 | 3.63775E−01 | −5.50238E−01 |
| A8 = | 3.51380E−01 | −2.51829E+00 | −3.58456E+00 | 9.86373E−01 | 7.02581E−01 |
| A10 = | 1.44995E−01 | 3.27843E+00 | 4.44987E+00 | −3.97732E+00 | 1.82041E+00 |
| A12 = | −1.21066E+00 | −3.00849E+00 | 3.15951E−01 | 4.79622E+00 | −2.51988E+00 |
| A14 = | 1.02310E+00 | 2.67001E+00 | −6.95011E−01 | −4.58203E−01 | 6.83241E−01 |
| A16 = | −1.19752E−01 | −1.08741E+00 | 6.85884E+00 | −2.73778E−01 | |

TABLE 19-continued

Aspheric Coefficients

| Surface # | | | | |
|---|---|---|---|---|
| 7 | 8 | 9 | 10 | 11 |
| k = −1.00000E+00 | −1.00000E+00 | −3.15705E+00 | −1.00000E+00 | −1.06468E+01 |
| A4 = −5.11159E−01 | −4.47338E−01 | −3.23393E−01 | −4.19233E−04 | −1.54132E−01 |
| A6 = 4.92177E−01 | 9.85229E−01 | 4.36546E−01 | 1.69346E−02 | 1.15191E−01 |
| A8 = −6.44266E−01 | −1.22259E+00 | −4.22500E−01 | 3.28201E−02 | −6.86652E−02 |
| A10 = 9.26992E−01 | 1.09616E+00 | 4.22465E−01 | −4.63797E−02 | 2.59555E−02 |
| A12 = −5.68541E−01 | −6.77275E−01 | −2.19041E−01 | 2.95397E−02 | −5.37428E−03 |
| A14 = 1.09519E−01 | 2.31537E−01 | 3.13952E−02 | −9.81841E−03 | 4.59560E−04 |
| A16 = | −3.06720E−02 | 3.95393E−03 | 1.29579E−03 | |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f | 3.11 | f3/f | −1.49 |
|---|---|---|---|
| Fno | 2.80 | f2/f3 | 1.36 |
| HFOV | 36.2 | f/f4 | 2.77 |
| (V2 + V3)/V1 | 0.84 | f/f5 | −2.60 |
| (T12 + T34)/T23 | 0.30 | (|f4| + |f5|)/(|f2| + |f3|) | 0.21 |
| CT2/CT3 | 1.00 | tan$^{-1}$(ImgH/f) | 36.31 |
| R1/R2 | 0.05 | Sd/Td | 0.83 |
| |R7/R8| | 15.01 | TTL/ImgH | 1.75 |
| R8/R10 | −0.64 | | |

Embodiment 8

Figure 8A:
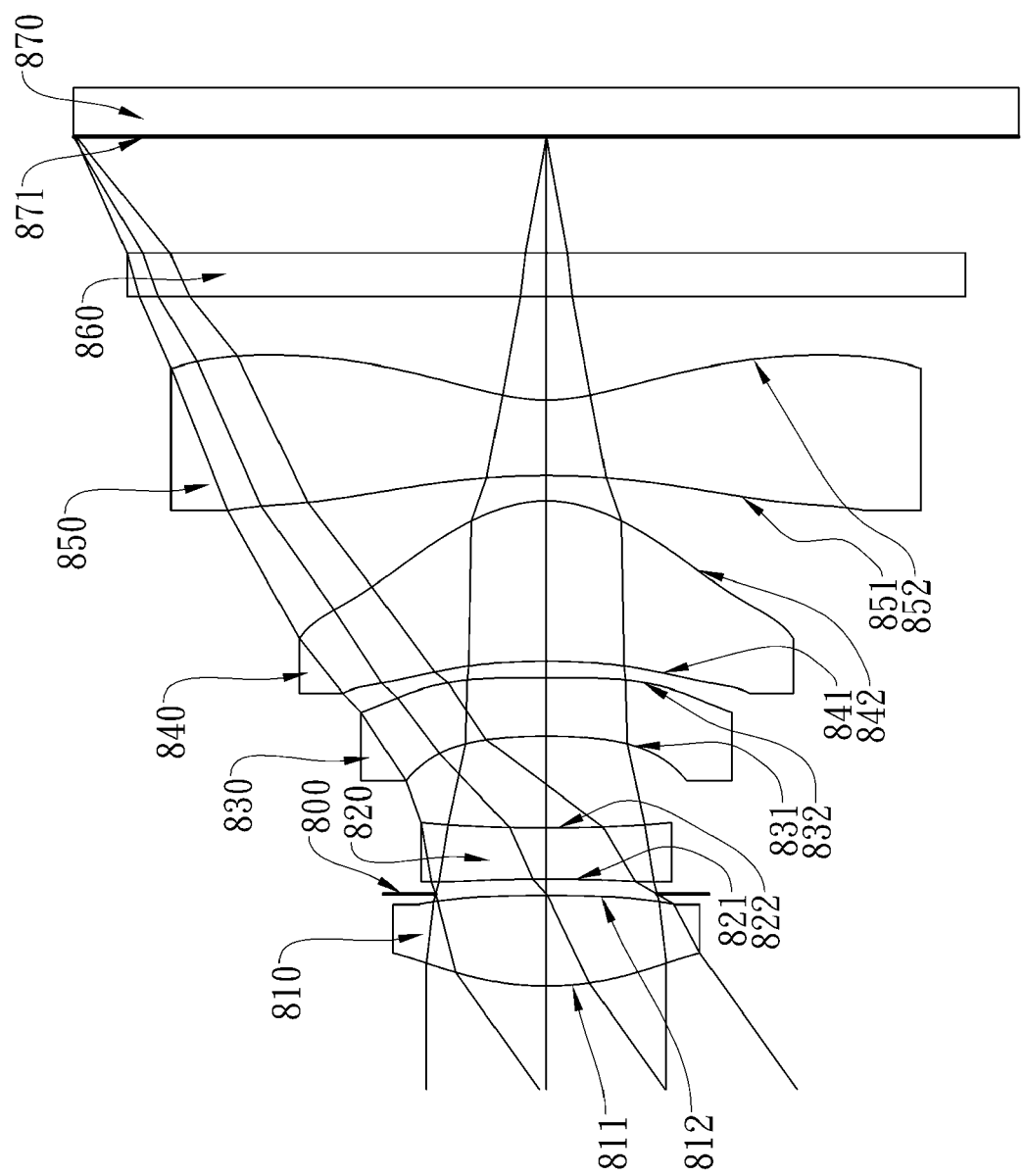
FIG. 8A shows an image capturing optical lens system in accordance with an eighth embodiment of the present invention.
Figure 8B:
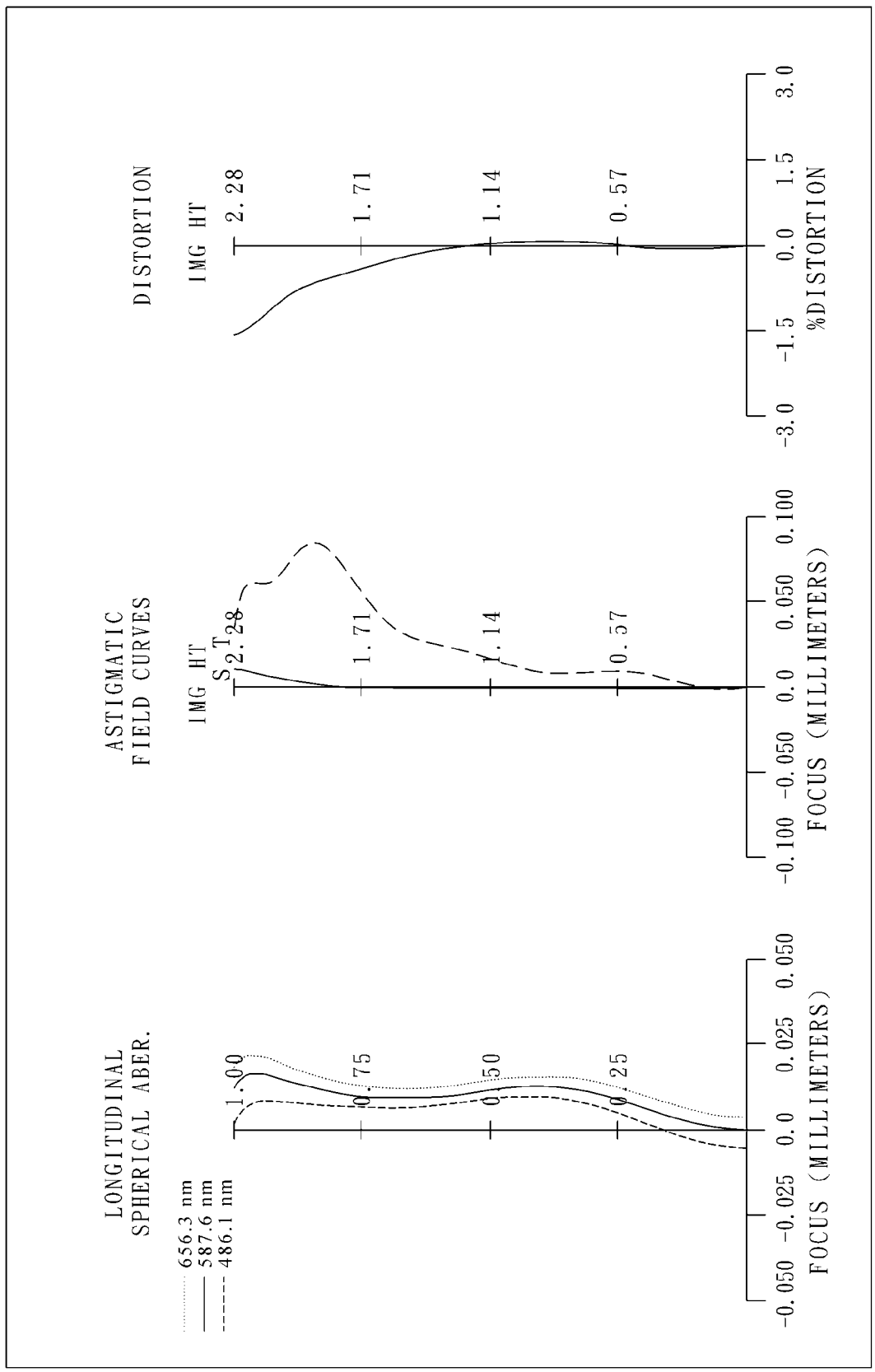
FIG. 8B shows the aberration curves of the eighth embodiment of the present invention.

FIG. 8A shows an image capturing optical lens system in accordance with the eighth embodiment of the present invention, and FIG. 8B shows the aberration curves of the eighth embodiment of the present invention. The image capturing optical lens system of the eighth embodiment of the present invention mainly comprises five lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with negative refractive power having a concave object-side surface 821 and a concave image-side surface 822, the object-side and image-side surfaces 821 and 822 thereof being aspheric;

a third lens element 830 made of plastic with negative refractive power having a concave object-side surface 831 and a convex image-side surface 832, the object-side and image-side surfaces 831 and 832 thereof being aspheric;

a fourth lens element 840 made of plastic with positive refractive power having a concave object-side surface 841 and a convex image-side surface 842, the object-side and image-side surfaces 841 and 842 thereof being aspheric; and a fifth lens element 850 made of plastic with negative refractive power having a concave object-side surface 851 and a concave image-side surface 852, the object-side and image-side surfaces 851 and 852 thereof being aspheric, and at least one inflection point is formed on the image-side surface 852 thereof;

wherein an aperture stop 800 is disposed between the first lens element 810 and the second lens element 820;

the image capturing optical lens system further comprises an IR filter 860 disposed between the image-side surface 852 of the fifth lens element 850 and an image plane 871, and the IR filter 860 is made of glass and has no influence on the focal length of the image capturing optical lens system; the image capturing optical lens system further comprises an image sensor 870 provided on the image plane 871.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 3.25 mm, Fno = 2.80, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.400190 (ASP) | 0.437 | Plastic | 1.544 | 55.9 | 2.36 |
| 2 | | −13.747400 (ASP) | 0.007 | | | | |
| 3 | Ape. Stop | Plano | 0.073 | | | | |
| 4 | Lens 2 | −10.752700 (ASP) | 0.250 | Plastic | 1.634 | 23.8 | −6.88 |
| 5 | | 7.399400 (ASP) | 0.443 | | | | |
| 6 | Lens 3 | −3.178700 (ASP) | 0.282 | Plastic | 1.634 | 23.8 | −5.25 |
| 7 | | −73.218200 (ASP) | 0.080 | | | | |
| 8 | Lens 4 | −4.265400 (ASP) | 0.779 | Plastic | 1.544 | 55.9 | 1.20 |
| 9 | | −0.603010 (ASP) | 0.123 | | | | |
| 10 | Lens 5 | −3.808600 (ASP) | 0.365 | Plastic | 1.544 | 55.9 | −1.24 |
| 11 | | 0.849330 (ASP) | 0.500 | | | | |

TABLE 21-continued (Embodiment 8)
f = 3.25 mm, Fno = 2.80, HFOV = 35.5 deg.

| Surface # | | Curvature Radius | Thickness | Material | Index | Abbe # | Focal length |
|---|---|---|---|---|---|---|---|
| 12 | IR-filter | Plano | 0.210 | Glass | 1.517 | 64.2 | — |
| 13 | | Plano | 0.563 | | | | |
| 14 | Image | Plano | — | | | | |

\* Reference wavelength is d-line 587.6 nm

TABLE 22

Aspheric Coefficients

| | | | Surface # | | |
|---|---|---|---|---|---|
| | 1 | 2 | 4 | 5 | 6 |
| k = | −7.70629E+00 | −3.90000E+01 | −5.90000E+01 | 3.36333E+01 | 1.53650E+01 |
| A4 = | 2.70540E−01 | −3.79137E−01 | −2.98199E−01 | −7.01875E−02 | −4.10122E−01 |
| A6 = | −5.03314E−01 | 1.06239E+00 | 1.86457E+00 | 2.36102E−01 | −4.33309E−01 |
| A8 = | 3.74442E−01 | −2.39950E+00 | −4.66022E+00 | 1.15465E+00 | 3.10406E−01 |
| A10 = | −2.23610E−01 | 3.03485E+00 | 6.09959E+00 | −6.10284E+00 | 1.08105E+00 |
| A12 = | −9.63234E−01 | −3.22895E+00 | 1.32704E+01 | 3.93347E+00 | −2.77856E+00 |
| A14 = | 8.34005E−01 | 5.59443E+00 | −7.85519E+01 | 1.05440E+01 | 2.08785E−01 |
| A16 = | 8.68585E−01 | −2.61361E+00 | 1.14018E+02 | −9.44151E+00 | |

| | | | Surface # | | |
|---|---|---|---|---|---|
| | 7 | 8 | 9 | 10 | 11 |
| k = | 5.00000E+01 | −4.90000E+01 | −3.13337E+00 | 0.00000E+00 | −8.14347E+00 |
| A4 = | −4.87278E−01 | −4.78857E−01 | −3.43834E−01 | 2.36117E−04 | −1.48647E−01 |
| A6 = | 4.21532E−01 | 1.02670E+00 | 4.87340E−01 | 1.56983E−02 | 1.19926E−01 |
| A8 = | −6.33554E−01 | −1.19706E+00 | −4.17127E−01 | 3.19768E−02 | −7.04255E−02 |
| A10 = | 9.62464E−01 | 1.10438E+00 | 4.12092E−01 | −4.59248E−02 | 2.64255E−02 |
| A12 = | −5.19087E−01 | −6.88343E−01 | −2.25199E−01 | 2.91755E−02 | −5.49264E−03 |
| A14 = | 8.13824E−02 | 2.25676E−01 | 2.70756E−02 | −9.79432E−03 | 4.67668E−04 |
| A16 = | | −7.57853E−02 | 3.92248E−03 | 1.31929E−03 | |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 3.25 | f3/f | −1.62 |
|---|---|---|---|
| Fno | 2.80 | f2/f3 | 1.31 |
| HFOV | 35.5 | f/f4 | 2.71 |
| (V2 + V3)/V1 | 0.85 | f/f5 | −2.62 |
| (T12 + T34)/T23 | 0.36 | (|f4| + |f5|)/(|f2| + |f3|) | 0.20 |
| CT2/CT3 | 0.89 | tan⁻¹(ImgH/f) | 35.11 |
| R1/R2 | −0.10 | Sd/Td | 0.84 |
| |R7/R8| | 7.07 | TTL/ImgH | 1.77 |
| R8/R10 | −0.71 | | |

It is to be noted that TABLES 1-23 show different data of the different embodiments, however, the data of the different embodiments are obtained from experiments. Therefore, any image capturing optical lens system of the same structure is considered to be within the scope of the present invention even if it uses different data. The embodiments depicted above and the appended drawings are exemplary and are not intended to limit the scope of the present invention.

What is claimed is:

1. An image capturing optical lens system comprising, in order from an object side to an image side:
    a first lens element with positive refractive power having a convex object-side surface;
    a second lens element with negative refractive power;
    a third lens element with negative refractive power having at least one of the object-side and image-side surfaces thereof being aspheric;
    a fourth lens element having at least one of the object-side and image-side surfaces thereof being aspheric; and
    a fifth lens element having a concave image-side surface, both the object-side and image-side surfaces thereof being aspheric, at least one inflection point is formed on at least one of the object-side and image-side surfaces thereof, and the fifth lens element is made of plastic;
    wherein a curvature radius of the object-side surface of the fourth lens element is R7, a curvature radius of the image-side surface of the fourth lens element is R8, a focal length of the second lens element is f2, a focal length of the third lens element is f3, a focal length of the image capturing optical lens system is f, and they satisfy the following relations:

$4.0 < |R7/R8|$;

$0.8 < f2/f3 < 10.0$; and $-2.0 < f3/f < -0.67$.

2. The image capturing optical lens system according to claim 1, wherein the fourth lens element has a convex image-side surface, and the fifth lens element has negative refractive power.

3. The image capturing optical lens system according to claim 2, wherein the fourth lens element has positive refractive power, a curvature radius of the object-side surface of the first lens element is R1, a curvature radius of the image-side surface of the first lens element is R2, and they satisfy the following relation:

$-0.8 < R1/R2 < 0.8$.

4. The image capturing optical lens system according to claim 3, wherein a focal length of the fourth lens element is f4, a focal length of the fifth lens element is f5, a focal length of the second lens element is f2, a focal length of the third lens element is f3, and they satisfy the following relation:

$0.05 < (|f4|+|f5|)/(|f2|+|f3|) < 0.5$.

5. The image capturing optical lens system according to claim 4, wherein the second lens element has a concave image-side surface, the third lens element has a concave object-side surface and the fifth lens element has a concave object-side surface.

6. The image capturing optical lens system according to claim 5, wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and they satisfy the following relations:

$|R3| > |R4|$; and $|R5| < |R6|$.

7. The image capturing optical lens system according to claim 5, wherein the curvature radius of the object-side surface of the fourth lens element is R7, the curvature radius of the image-side surface of the fourth lens element is R8, and they satisfy the following relation:

$7.0 < |R7/R8|$.

8. The image capturing optical lens system according to claim 4, wherein the curvature radius of the object-side surface of the first lens element is R1, the curvature radius of the image-side surface of the first lens element is R2, and they satisfy the following relation:

$-0.3 < R1/R2 < 0.2$.

9. The image capturing optical lens system according to claim 8, wherein the focal length of the third lens element is f3, the focal length of the image capturing optical lens system is f, and they satisfy the following relation:

$-1.7 < f3/f < -0.8$.

10. The image capturing optical lens system according to claim 8, wherein an axial distance between the first lens element and the second lens element is T12, an axial distance between the third lens element and the fourth lens element is T34, an axial distance between the second lens element and the third lens element is T23, and they satisfy the following relation:

$0.1 < (T12+T34)/T23 < 0.5$.

11. The image capturing optical lens system according to claim 8, wherein the focal length of the fourth lens element is f4, the focal length of the fifth lens element is f5, the focal length of the second lens element is f2, the focal length of the third lens element is f3, and they satisfy the following relation:

$0.1 < (|f4|+|f5|)/(|f2|+|f3|) < 0.3$.

12. The image capturing optical lens system according to claim 2, wherein an Abbe number of the first lens element is V1, an Abbe number of the second lens element is V2, an Abbe number of the third lens element is V3, and they satisfy the following relation:

$(V2+V3)/V1 < 1.0$.

13. The image capturing optical lens system according to claim 12, wherein the curvature radius of the image-side surface of the fourth lens element is R8, a curvature radius of the image-side surface of the fifth lens element is R10, and they satisfy the following relation:

$-1.0 < R8/R10 < -0.5$.

14. The image capturing optical lens system according to claim 13, wherein the focal length of the image capturing optical lens system is f, a focal length of the fourth lens element is f4, a focal length of the fifth lens element is f5, and they satisfy the following relations:

$f/f4 > 2.0$; and $f/f5 < -2.0$.

15. The image capturing optical lens system according to claim 13, wherein the focal length of the second lens element is f2, the focal length of the third lens element is f3, and they satisfy the following relation:

$1.2 < f2/f3 < 4.5$.

16. The image capturing optical lens system according to claim 3, further comprises a stop, an axial distance between the stop and the image-side surface of the fifth lens element is Sd, an axial distance between the object-side surface of the first lens element and the image-side surface of the fifth lens element is Td, and they satisfy the following relation:

$0.75 < Sd/Td < 1.1$.

17. The image capturing optical lens system according to claim 16, wherein a central thickness of the second lens element is CT2, a central thickness of the third lens element is CT3, and they satisfy the following relation:

$0.7 < CT2/CT3 < 1.3$.

18. The image capturing optical lens system according to claim 17, further comprises an image sensor provided on an image plane, half of a diagonal length of an effective photosensitive area of the image sensor is ImgH, the focal length of the image capturing optical lens system is f, and they satisfy the following relation:

$\tan^{-1}(ImgH/f) > 34$.

19. The image capturing optical lens system according to claim 3, further comprises an image sensor provided on an image plane, an axial distance between the object-side surface of the first lens element and the image plane is TTL, half of a diagonal length of an effective photosensitive area of the image sensor is ImgH, and they satisfy the following relation:

$TTL/ImgH < 2.0$.

* * * * *